(12) United States Patent
Sudoh

(10) Patent No.: US 6,421,061 B1
(45) Date of Patent: Jul. 16, 2002

(54) MATHEMATICAL SET DISPLAY APPARATUS AND METHOD, AND STORAGE MEDIUM HAVING PROGRAM RECORDED THEREON

(75) Inventor: Tomohiro Sudoh, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/238,281

(22) Filed: Jan. 27, 1999

(30) Foreign Application Priority Data

Jan. 29, 1998 (JP) ............................................ 10-016990
Dec. 28, 1998 (JP) ............................................ 10-374816

(51) Int. Cl.⁷ .............................. G06F 3/00; G09B 3/00
(52) U.S. Cl. ........................ 345/629; 345/530; 345/643; 345/468
(58) Field of Search ................................. 345/440, 112, 345/131, 133, 418, 433, 643, 468, 501, 530, 531, 537–538, 204, 4, 467, 441; 706/13; 707/538, 526; 700/17

(56) References Cited

U.S. PATENT DOCUMENTS

| | | | | |
|---|---|---|---|---|
| 3,927,752 A | * | 12/1975 | Jones | ............................ 197/19 |
| 4,217,702 A | * | 8/1980 | Bennett | ........................ 364/861 |
| 4,935,877 A | * | 6/1990 | Koza | ............................ 706/13 |
| 5,281,145 A | * | 1/1994 | Sidrak | ........................... 434/215 |
| 5,343,554 A | * | 8/1994 | Koza | ............................ 706/13 |
| 5,377,130 A | * | 12/1994 | Frank et al. | ............. 364/709.12 |
| 5,481,626 A | * | 1/1996 | Matsubayashi | .............. 382/189 |
| 5,528,524 A | * | 6/1996 | Oba | ........................ 364/709.12 |
| 5,559,939 A | * | 9/1996 | Wada et al. | ................ 345/467 |
| 5,636,334 A | * | 6/1997 | Hidaka | ......................... 345/419 |
| 6,018,617 A | * | 1/2000 | Sweitzer | ....................... 345/114 |

* cited by examiner

*Primary Examiner*—Matthew Luu
*Assistant Examiner*—Wesner Sajous
(74) *Attorney, Agent, or Firm*—Frishauf, Holtz, Goodman & Chick, P.C.

(57) ABSTRACT

A set diagram display control apparatus performs a set diagram display process. When the elements or number count of each of a plurality of sets is input to a set relation list, the element counts of all set relations are calculated in accordance with the elements or element counts of those sets. A display range of a set diagram is determined in accordance with the input or calculated element counts. The areas of circular diagrams which compose the set diagram are displaced in correspondence to their elements counts in the displayed range. And the displayed positions and radii of the circular diagrams are determined depending on the element count of the set diagram, in order to display the set diagram as composed of the circular diagrams.

3 Claims, 31 Drawing Sheets

817

| AREA | SET RELATION | RANGE |
|---|---|---|
| e1 | $A \cap \overline{(B \cup C)}$ | |
| e2 | $B \cap \overline{(A \cup C)}$ | |
| e3 | $C \cap \overline{(A \cup B)}$ | |
| e4 | $(A \cap B) \cap \overline{(A \cap B \cap C)}$ | |
| e5 | $(B \cap C) \cap \overline{(A \cap B \cap C)}$ | |
| e6 | $(A \cap C) \cap \overline{(A \cap B \cap C)}$ | |
| e7 | $A \cap B \cap C$ | |
| e1,e4,e6,e7 | A | |
| e2,e4,e5,e7 | B | |
| e1,e2,e4,e5,e6,e7 | $A \cup B$ | |
| ⋮ | ⋮ | ⋮ |

| SET EXPRESSION | ELEMENT COUNT |
|---|---|
| A | 45 |
| B | 22 |
| C | 7 |
| D | 50 |
| $A \cap B$ | 7 |
| $B \cap C$ | 3 |
| $A \cap C$ | 1 |
| $A \cup B$ | 60 |
| $B \cup C$ | 26 |
| ⋮ | ⋮ |

FIG.22B

| SET | ELEMENTS | 806 |
|---|---|---|
| A | 2, 4, 6, 8, 10, 12 | |
| B | 4, 8, 12, 16, 20 | |
| C | 6, 12, 18, 20 | |

| AREA | SET RELATION | ELEMENT |
|---|---|---|
| e1 | $A \cap \overline{(B \cup C)}$ | 2, 10 |
| e2 | $B \cap \overline{(A \cup C)}$ | 16 |
| e3 | $C \cap \overline{(A \cup B)}$ | 18 |
| e4 | $(A \cap B) \cap \overline{(A \cap B \cap C)}$ | 4, 8 |
| e5 | $(B \cap C) \cap \overline{(A \cap B \cap C)}$ | 20 |
| e6 | $(A \cap C) \cap \overline{(A \cap B \cap C)}$ | 6 |
| e7 | $A \cap B \cap C$ | 12 |
| ⋮ | ⋮ | ⋮ |

US 6,421,061 B1

MATHEMATICAL SET DISPLAY APPARATUS AND METHOD, AND STORAGE MEDIUM HAVING PROGRAM RECORDED THEREON

BACKGROUND OF THE INVENTION

The present invention concerns display control of set diagrams and, more particularly, to a set diagram display control apparatus method and storage medium for changing and displaying the positions and sizes of the set diagrams in accordance with their element count, and distinctively displaying a specified set diagram.

Conventional computers used, for example, in the field of learning, have the functions of ordinary arithmetic operations, as well as the functions of calculation or statistic calculation, programmed computation and graph plotting, in accordance with a calculating expression and calculation result data.

However, since conventional computers have no function of performing operations on sets, they can not display a mathematical expression using mathematical symbols inherent to the sets, they can not make a calculation of their elements and element counts, and they can not display diagrams indicative of sets.

It is therefore a first object of the present invention to provide a set calculating apparatus and recording program for making a calculation on sets.

A second object of the present invention is to provide a set calculating apparatus and recording program for displaying a diagram indicative of a relation between sets.

Still another object of the present invention is to provide a set diagram display control apparatus and storage medium capable of calculating a set relation (which in this specification implies a combination of sets or a derivative of a set), displaying set diagrams indicative of set relations each in an appropriate size in a display picture, or determining and displaying the size and the position of each set diagram on the basis of its count element and, further, displaying the elements and element count of the set in the set diagram, and distinctively displaying a specified one of the elements of the thus displayed set or set diagram.

SUMMARY OF THE INVENTION

In order to achieve the above-mentioned objects, according to the present invention, there is provided a set calculation apparatus comprising:

set expression input means for inputting an expression of sets;

set operating means for performing an operation corresponding to the expression of sets input by said set expression input means; and displays means for displaying a result of the operation performed by said set operating means.

BRIEF DESCRIPTION OF THE DRAWINGS

FIGS. 22A and 22B each show an example of data stored in a RAM 8 in the tracing process, in which FIG. 22A shows data stored in a region data memory 817, and FIG. 22B shows data stored in an element count data memory 816;

FIGS. 23A and 23B each show an example of set diagrams, and a set relation list G5 in the tracing process where a set list is not set, in which FIG. 23A shows an example in which an enclosed area is distinctively displayed by specifying a corresponding item of the set relation list G5, and FIG. 23B is a view showing an example where a set expression and its element counts corresponding to the specified enclosed areas are displayed;

FIGS. 25A, 25B and 25C show an example of set diagrams, and a set relation list G5 in the tracing process where the set list is set, in which FIG. 25A shows enclosed regions of the set diagram, and FIGS. 25B and C show an example where the set expression and element counts corresponding specified the enclosed region;

FIG. 26 is a flow chart of an element count display process executed by the set diagram display control apparatus FIGS. 27A, 27B and 27C each show an example of an element count display process, in which

FIGS. 29A, 29B and 29C each show an example of information regarding sets and enclosed regions concerned in the element display process, in which FIG. 29A shows an example of data stored in a list data memory 806, FIG. 29B shows enclosed regions formed by rectangular and circular diagrams of the set diagrams, and FIG. 29C shows an example of data stored in an area data memory 817;

FIGS. 30A and 30B each show display examples in the element display process, in which FIG. 30A shows set elements displayed in the enclosed areas of the set diagrams and FIG. 30B shows an example of a specified element and a set expression to which the specified element belongs.

DESCRIPTION OF PREFERRED EMBODIMENTS

[First Embodiment]

A first embodiment of a set diagram display control apparatus 1 according to the present invention will be to be explained more specifically with reference to FIGS. 11–14.

(Composition)

Figure 1:
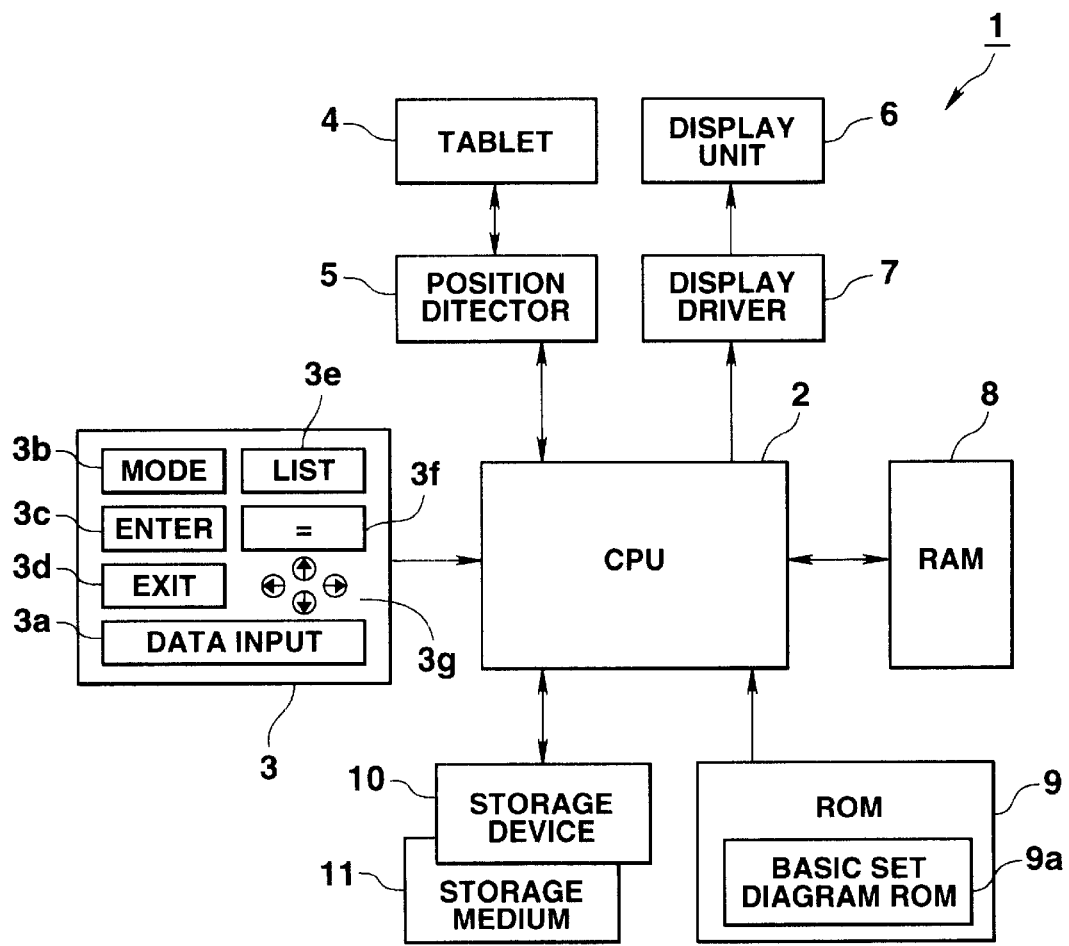
FIG. 1 is a block diagram of a set diagram display control apparatus 1 according to the present invention.

FIG. 1 is a block diagram of the inventive set diagram display control apparatus 1. In FIG. 1, the set diagram display control apparatus 1 comprises a CPU (Central Processing Unit) 2, an input unit 3, a tablet 4, a position detector 5, a display unit 6, a display driver 7, a RAM (Random Access Memory) 8, a ROM (Read Only Memory) 9, a storage device 10, and a storage medium 11.

In accordance with data input from the input unit 3 and touch position data input by an input pen from the tablet 4 via the position detector 5, the CPU 2 reads a predetermined program from the ROM 9 or the storage device 10, temporarily stores the program in the RAM 8, executes various processes based on the program to provide centralized control over sections of the set diagram display control apparatus 1. Namely, the CPU 2 executes various kinds of processes based on the read out program, stores the result of the processing in the RAM 8 and displays it via the display driver 7 on the display unit 6. Further, the CPU 2 stores the result of the processing via the storage device 10 into the storage medium 11 in accordance with instructions input via input unit 3 or the tablet 4.

The CPU 2 displays a mode selection picture G (FIG. 6A) based on an initial picture display program stored in the ROM 9. When a set mode is selected and set from the input unit 3 or the tablet 4 in the mode selection picture G, the CPU 2 further displays via of the display driver 7 on the display unit a set processing menu picture G1 (FIG. 6B) for selecting one of a set calculation mode or a set diagram calculation mode. Then, when the set calculation mode is selected by a user, the CPU 2 sets a set processing flag F set in the set process flag memory 803 in the RAM 8 at "1", and executes a set calculating process to be described later (FIG. 7 and FIG. 9) in accordance with the set calculating processing program stored in the ROM 9.

Further, when the set diagram calculation mode is selected on the set process menu picture G1, the CPU 2 sets the set process flag F set in set processing memory 803 in the RAM 8 at "2" and performed a set diagram calculating process (FIGS. 7, 13) in accordance with a set diagram calculating program stored in the ROM 9.

In the set calculating process to be described later (FIGS. 7, 9), the CPU 2 stores the elements of a set input to a set list into a list data memory 806 in the RAM 8. When a set expression (a set relation such as a common set, sum set or complementary set) is further input, the CPU 2 reads out a set relation diagram corresponding to the input set expression from a basic set diagram the ROM 9a, displays it (FIGS. 10 and 11), further, calculates the elements and element count of the set expression, additionally stores them in the list data memory 806, and displays the calculated set elements and element count on the display unit 6. If the input set expression is an element count calculating expression for determining the element count, the CPU 2 calculates and displays the elements and element count of the calculating expression. Further, where the elements of a set are not input to the set list, and if the input set expression is expandable, the CPU 2 expands and displays the set expression (FIG. 12).

In the set diagram calculating process (FIGS. 7 and 13), the CPU 2 displays on the display unit 6 a set diagram display range G4 which indicates set diagrams, and a set relation list G5 to which the elements and element count of the set and a set expression are input. When the elements and element counts of sets are input to the set relation list G5, the CPU 2 calculates the elements and element counts of each of all calculatable relations (common set, sum set, complementary set, etc.) based on the input sets, stores them into the list data memory 806, and displays them on the display unit 6. Further, the CPU 2 determines the sizes of circles indicative of the respective sets from the respective ratios of the element counts of the sets, and displays the sizes on the display unit 6 (FIGS. 14 and 15).

The input unit 3 comprises data input keys 3a which comprise a group of character/symbol keys such as numerical keys, alphabetical keys, operand keys, function keys, and set symbol keys, as well as "MODE" keys 3b to be operated for selective setting of various operation modes such as a set mode for inputting and calculating a set expression, and displaying a set image (diagram), and a function mode for performing a calculating process corresponding to an optional input function expression, an "ENTER" key 3c to be operated for instructing the CPU to fix selected data or execute of a function, an "EXIT" key 3d to be operated to display the elements and element count of a set based on the existent set data in the set mode, a "LIST" key 3e to be operated to display an input picture of a set list in which the set data is stored as a list which places the elements of each set and its element count in corresponding relationship, a "=" key 3f to be operated to instruct the CPU to start an operation corresponding to the input expression, and upper, lower, right and left cursor key 3g operated to select and deliver displayed data and move a cursor K. Thus, a depressed key provides a corresponding signal to the CPU 2.

A tablet 4 is an input instrument including a combination of a device such as an input pen P for indicating coordinates and a plate-shaped device that senses the indicated coordinate. The coordinates of a position indicated by the input pen P are detected by the position detector 5 based on a coordinate reading principle for example an electromagnetic induction system, magneto-restrictive system or pressure sensitive system. The tablet 4 is integral with a display unit 6, so that an icon or the like displayed by the display unit 6 can be indicated directly by the input pen P to perform an input operation.

The display unit 6 comprises, for example, a LCD (liquid crystal display), and provides various displays based on a driving signal input from the display driver 7. The display driver 7 generates a drive signal based on the display data input from the CPU 2 to control a display of the display unit 6.

Figure 2:
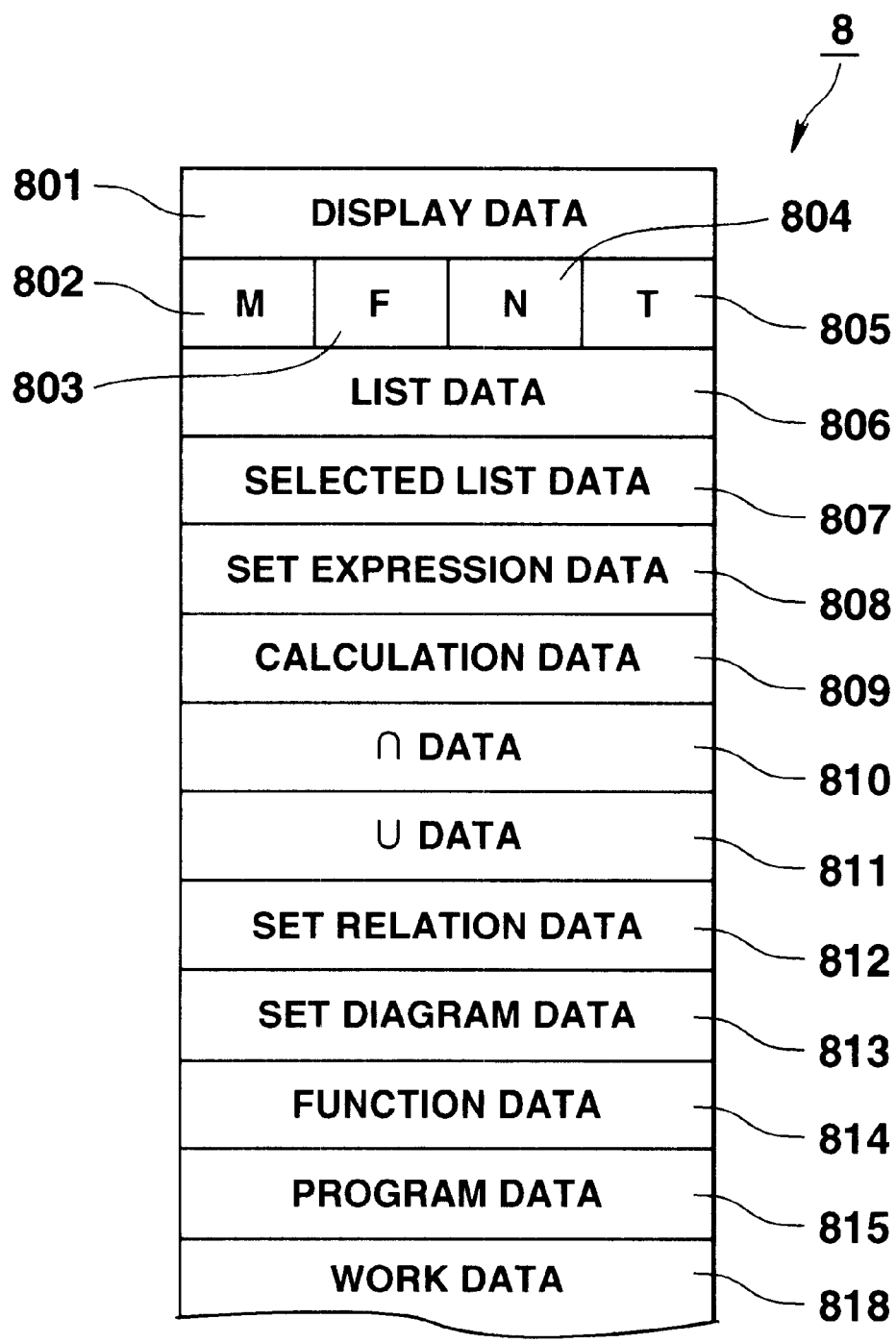
FIG. 2 illustrates the composition of a memory set in a RAM 8 of a first embodiment of the set diagram control apparatus 1.

FIG. 2 shows the composition of a memory provided in the RAM 8. The RAM 8 comprises a display data memory 801, a mode data memory (M) 802, a set process flag memory (F) 803, a list display flag memory (N) 804, a basic set diagram display flag memory (T) 805, a list data memory 806, a selected list data memory 807, a set expression data memory 808, a calculation data memory 809, a ∩ data memory 810, a ∪ data memory 811, a set relation data memory 812, a set diagram data memory 813, a function data memory 814, a program data memory 815, and a work memory 818.

The display data memory 801 stores data to be displayed on the display unit 6 as a bit map pattern data.

The mode data memory 802 stores mode setting data showing a placed operation mode.

The set process flag memory 803 stores a set process flag F that is set at "1" when the set calculation mode is selectively set and set at "2" when the set diagram calculation mode is selectively set, in the set calculation mode.

The list display flag memory 804 stores the list display flag N that is set at "1" when the list data of the set is displayed.

The basic set diagram display flag memory 805 stores the basic set diagram flag T that is be set at "1" when a basic set diagram corresponding to the input set expression is displayed in a case where the set list is not set.

Figure 3:
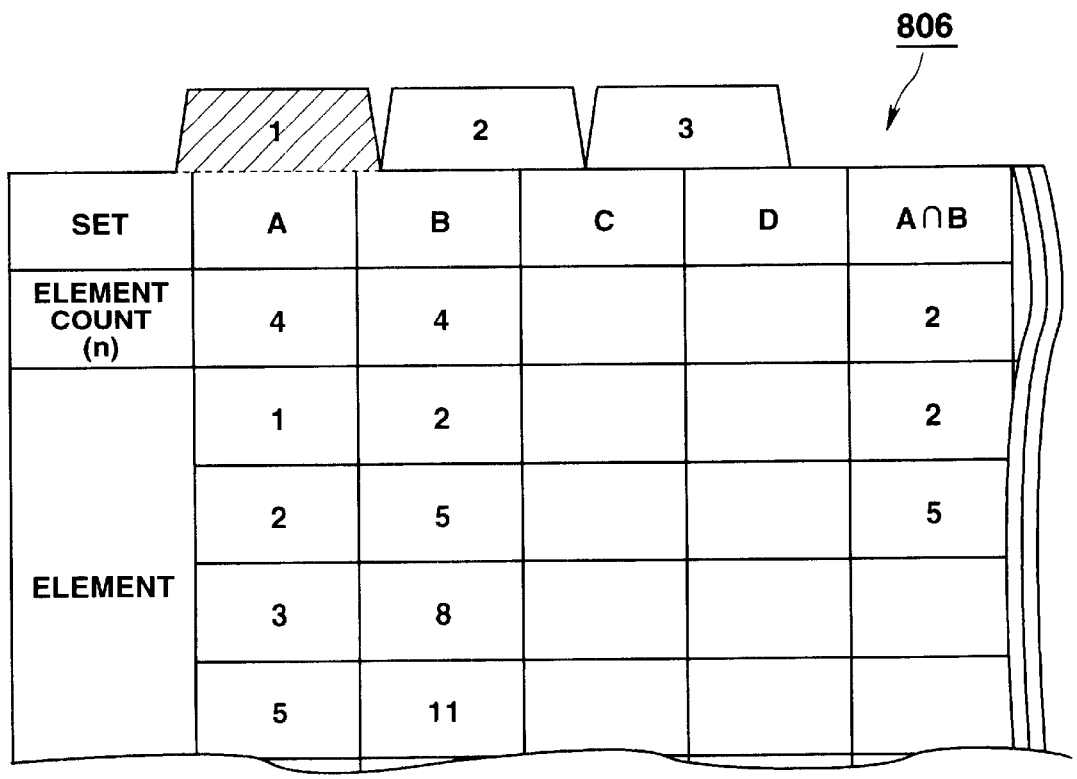
FIG. 3 illustrates of information on sets input to a set list stored in a list data memory 806.

FIG. 3 shows an example of a list input picture based on the contents of the data stored in the list data memory 806 of the RAM 8 of the set diagram display control apparatus 1.

The list data memory 806 stores a plurality of sheets each comprising a combination of sets, their respective elements and element counts optionally input to the set list of the list input picture in correspondence to their symbols.

The selected list data memory 807 stores a sheet number representing a combination of sets optionally selected and set in the set list stored in the list data memory 806.

The set expression data memory 808 successively stores set expressions input from the input unit 3.

The calculation data memory 809 updates and stores data calculated in accordance with the set expression data stored in the set expression data memory 808 each time this calculation is performed.

The ∩ data memory 810 stores the elements and element count of a common set deriving form a plurality of sets obtained in accordance with an expression of a common set stored in the set expression data memory 808.

The ∪ data memory 811 stores the elements and element count of the sum of a plurality of sets obtained and its element count in accordance with an expression of a sum set stored in the set expression data memory 808.

The set relation data memory 812 stores data indicative of a relation between each of sets (a common set, sum set, complementary set or subset) as a combination of sets set by selection of a sheet of list data (FIG. 3).

The set diagram data memory 813 stores, as drawn diagram data, set diagrams corresponding to a set expression input, for example, in a set calculating process (FIG. 9) and a set diagram calculating process (FIG. 13) to be executed in the set mode.

The function data memory 814 stores processed data obtained in the setting of the function mode.

The program data memory 815 stores processed data obtained in the setting of the program mode.

The work memory 818 temporarily stores data input and output by the CPU 2, and an application program specified by the CPU, an input instruction, input data and result of processing by the CPU in various operational modes.

The ROM 9 comprises a basic set diagram ROM 9a which contains basic programs for the set diagram display control apparatus 1 and a basic set diagram. The basic programs are not required to be rewritten and are a whole process program executed when the power source for the set diagram display control apparatus 1 is turned on, a set mode processing program, a set calculating process program and a set diagram calculating process program.

Further, the basic set diagram ROM 9a contains data on a rectangular diagram and a present plurality of circular diagrams of different sizes (larger, medium, smaller, etc.) required for display of the set image, and data on a plurality of basic set diagrams corresponding to a plurality of preset combinations of sets.

The storage device 10 has a storage medium 11 which comprises a magnetic or optical recording medium, or a semiconductor memory provided fixedly or detachably in the storage device 10. The storage medium 11 stores various processing programs for the set diagram display control apparatus 1 and data processed by those processing programs.

Further, the programs and the data stored in the storage medium 11 may be received from a storage device of other equipment which may include a recording medium (which contains programs and data such as those contained in the recording medium 11) via communication lines.

Operation

Figure 4:
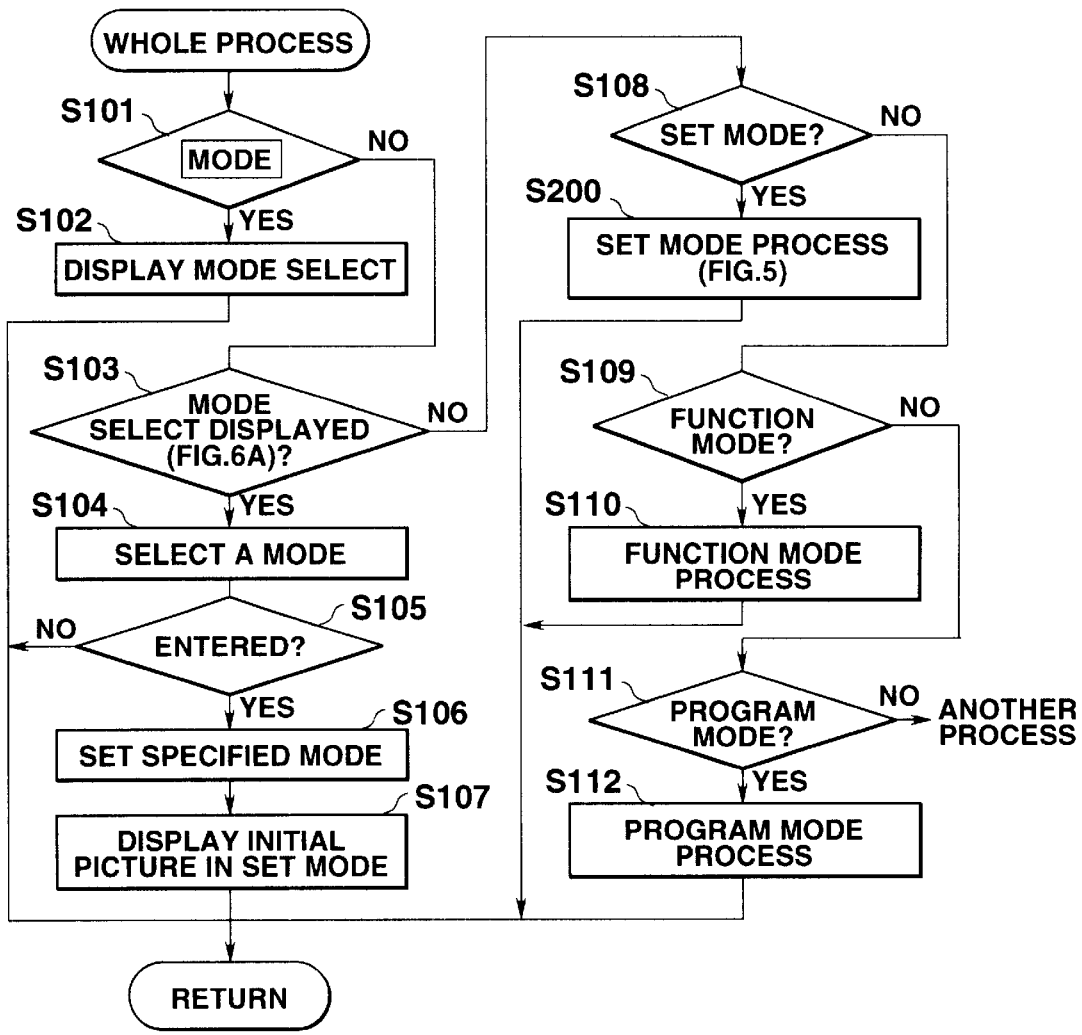
FIG. 4 is a flow chart of a whole process executed by the set diagram display control apparatus 1.

FIG. 4 is a flow chart of the whole process performed by the set diagram display control apparatus 1.

When the "MODE" key 3b of the input unit 3 is operated (step S101), the CPU 2 displays, on the display unit 6, a mode selection picture G (FIG. 6A) in which a mode menu for selectively setting an operation mode such as a set mode, a function mode or a program mode is presented (step S102).

If an optional mode is selected by the cursor (step S104) and the "ENTER" key 3c is operated (step S105: Yes), in a state in which the mode selection picture G is displayed (step S103: Yes), the CPU 2 stores mode data M indicative of the selected operation mode in the mode data memory 802 in the RAM 8 (step S106), and starts up a control program corresponding to the operation mode to display an initial display picture (step S107).

When the set mode for input and calculation of a set expression and display of set diagrams is selected and set (step S108: Yes) by the mode selection and setting process (step S101–step S107), the CPU 2 displays on the display unit 6 a set mode selection picture G1 (FIG. 6B) for setting any one of the "set calculation" or "set diagram calculation" and starts up the set mode process (step S200).

When the function mode is selected and set (step S109: Yes) in the mode selection and setting process (step S101–step S107), the CPU 2 displays on the display unit 6 an initial display picture for inputting any function expression to be operated and then starts up the function mode process (step S110).

When the program mode is selected and set (step S111: Yes) in the mode selection and setting process (step S101–step S107), the CPU 2 displays on the display unit 6 an initial display picture for inputting an optional program data, and starts up a program mode process (step S112).

Further, when another operation mode is selected and set (at step S111; No) in the mode selection and setting process (step S101–step S107), the CPU 2 displays its initial display picture on the display unit 6 and then starts up a corresponding operation mode process.

Figure 5:
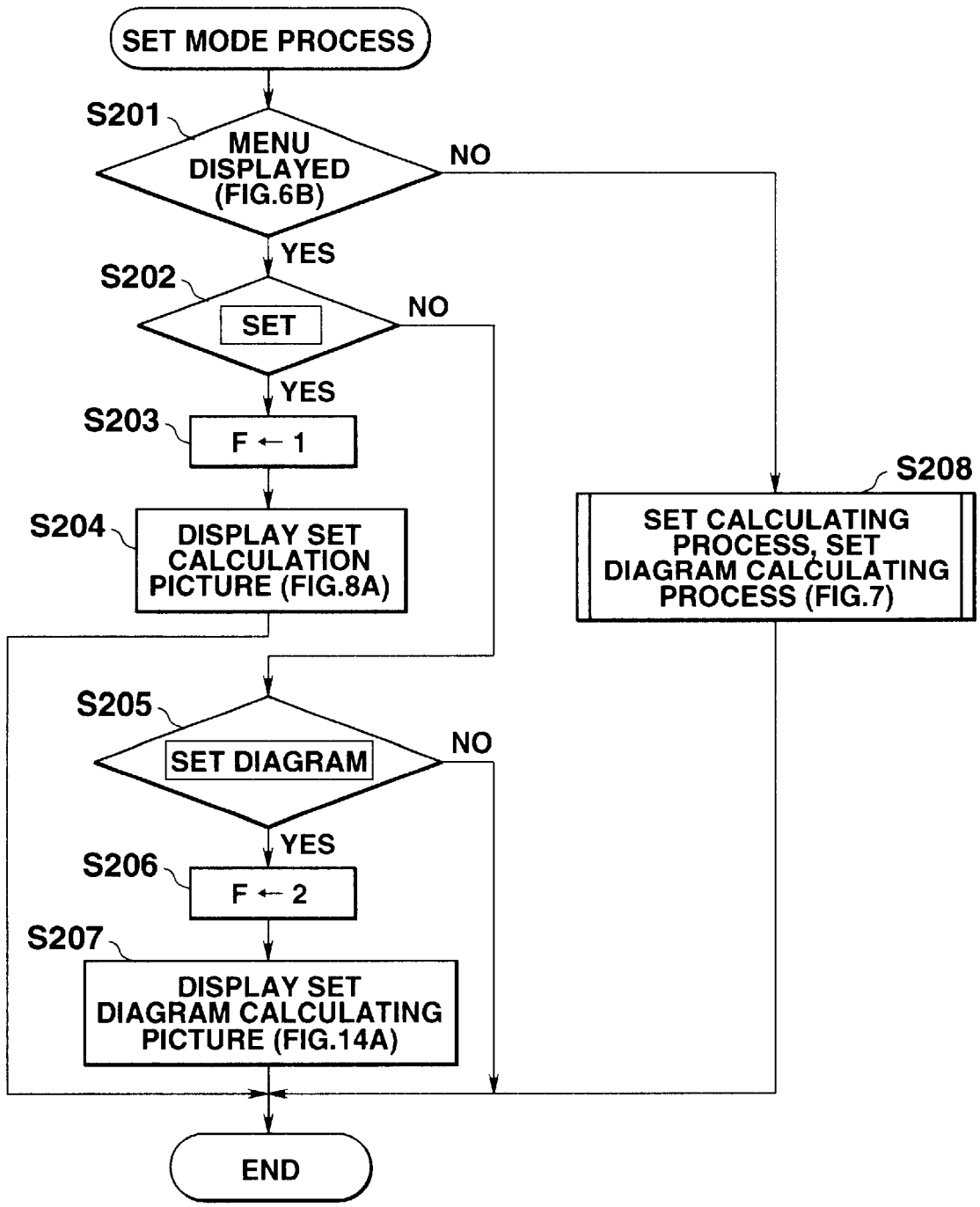
FIG. 5 is a flow chart of a set mode process executed by the set diagram display control apparatus 1.
Figure 6A:
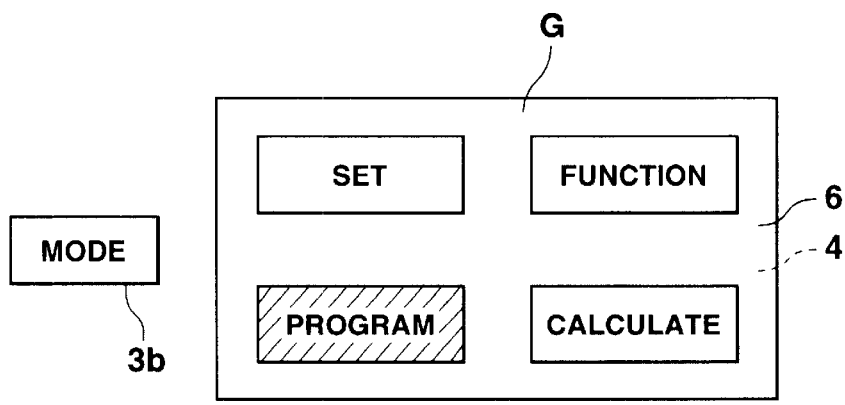
FIGS. 6A and 6B each show an operation display state involving the setting of the set mode process executed by the set diagram display control apparatus 1.

FIG. 5 is a flow chart of a set mode process executed by the set diagram display control apparatus 1. FIGS. 6A and B, each show setting the set mode process of the set diagram display control apparatus 1.

Figure 6B:
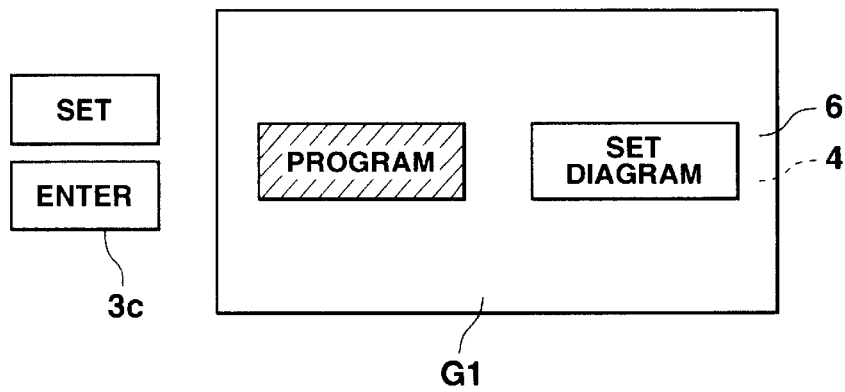

More particularly, when the menu item "SET" is selected and the "ENTER" key 3c is operated as shown in FIG. 6B, in a state where the mode selection picture G is displayed on the display unit 6 by the operation of the "MODE" key 3b of the input unit 3, as shown in FIG. 6A, in the mode selection and setting process (step S101–step S107) in FIG. 4, the CPU 2 sets the set mode data M in the mode data memory 802 in the RAM 8, starts up the set mode process, and displays on the display unit 6 the set process menu picture G1 for selecting the set calculating process and the set diagram calculating process (step S201; Yes).

When the set calculating process is selected by touching an icon "SET" on the tablet 4 with an input pen P (step S202; Yes) in this display state of the set process menu picture G1, the CPU 2 sets the set process flag F of the set process flag memory 803 in the RAM 8 at "1" indicative of the setting of the set calculating process (step S203) and displays on the display unit 6 the set calculation input picture G2 in which various set symbols 21a–21f used for performing the set calculating process are arranged (refer to FIG. 8A) (step S204).

Further, when the set diagram calculating process is selected by touching the icon "SET DIAGRAM" on the tablet 4 with the input pen P in the display state of the set process menu picture G1 (No in step S202; Yes in step S205), the CPU 2 sets the set process flag F in the set process flag memory 803 in the RAM 8 at "2" indicative of the setting of the set diagram calculating process (step S206) and displays on the display unit 6 the set diagram calculation input picture (FIG. 14A) for performing the set diagram calculating process (step S207).

Figure 7:
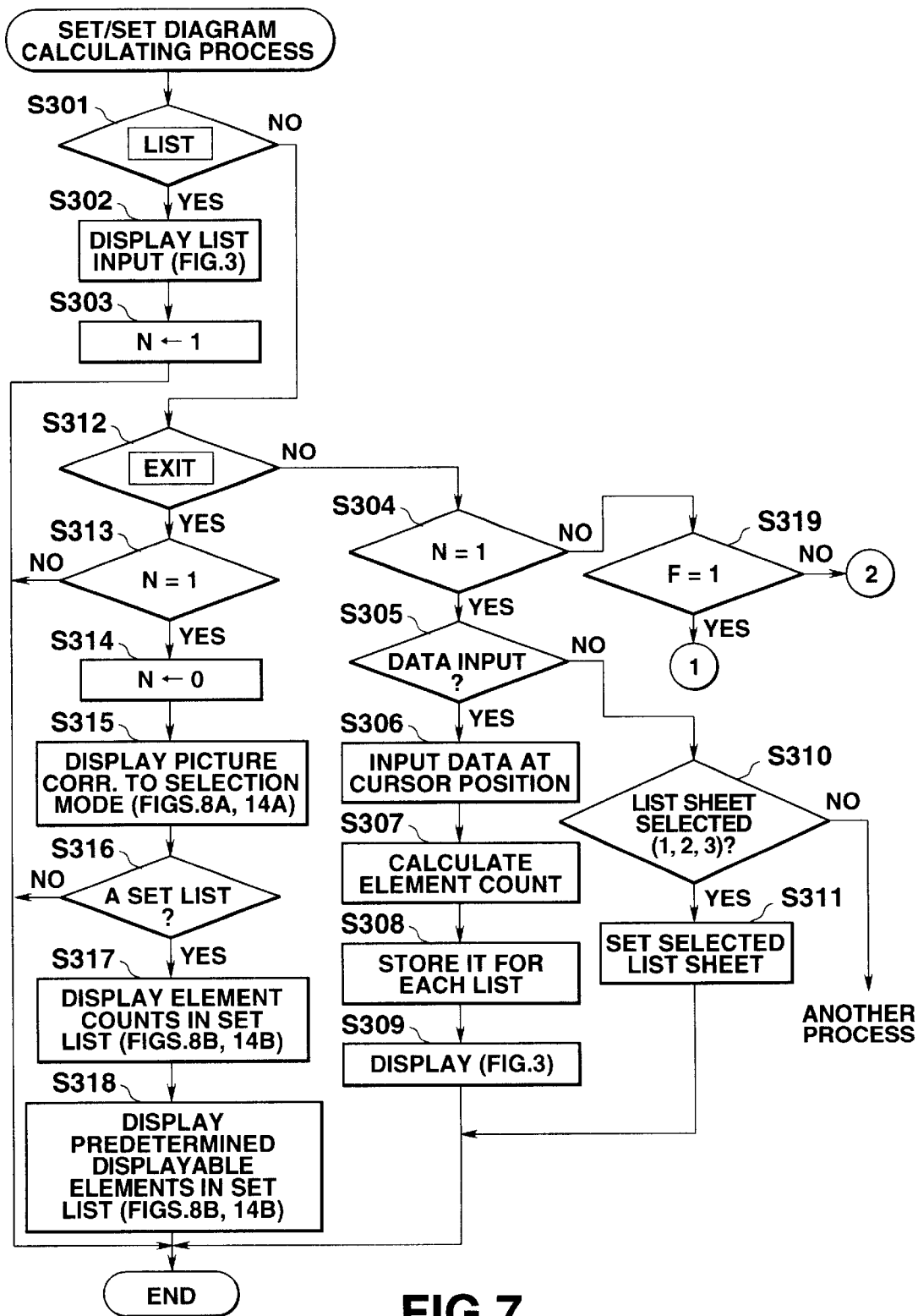
FIG. 7 is a flow chart of a process common to the set calculating process and a set diagram calculating process executed by the set diagram display control apparatus 1.
Figure 9:
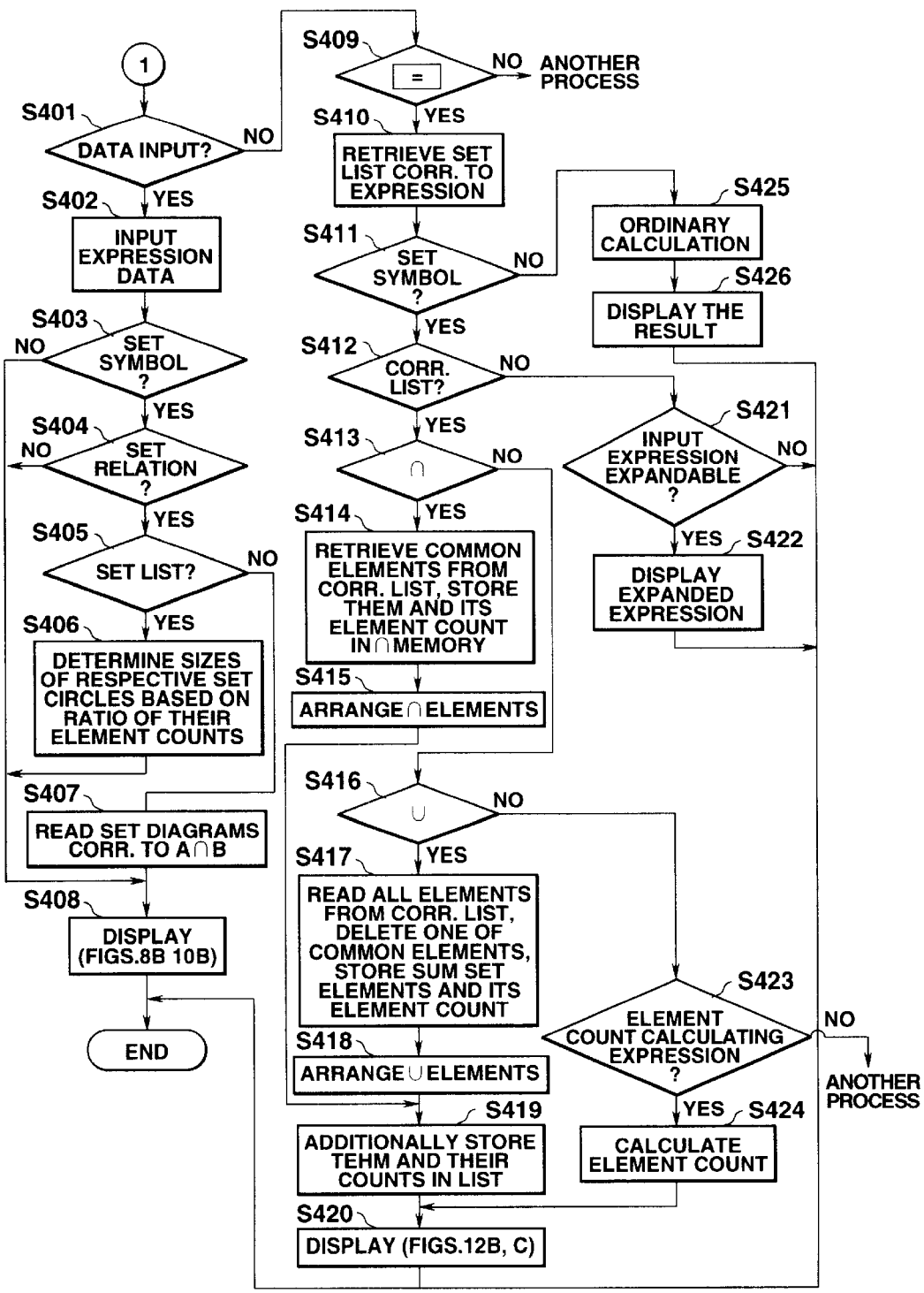
FIG. 9 is a flow chart of the set calculating process executed by the set diagram display control apparatus 1.
Figure 13:
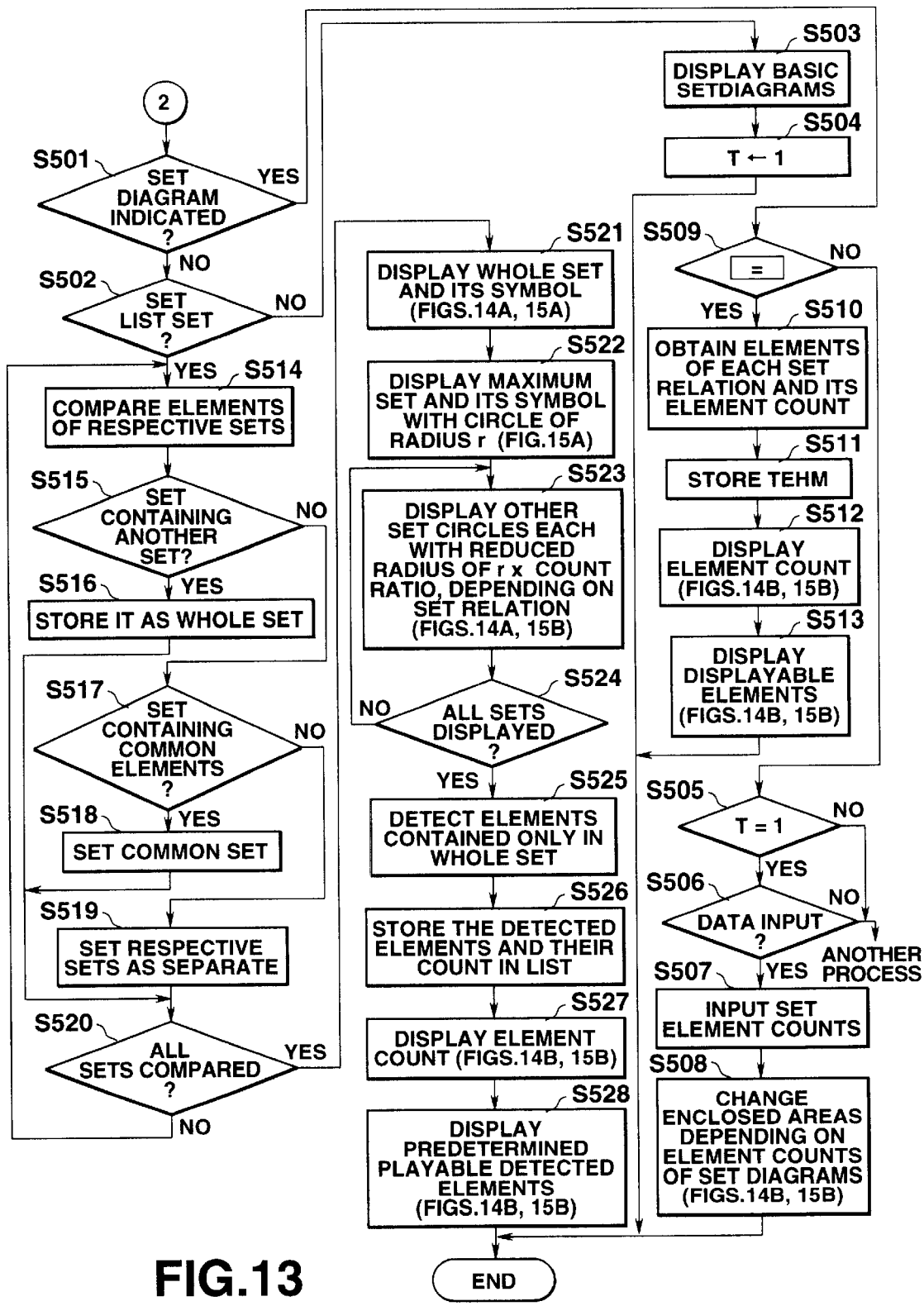
FIG. 13 is a flow chart of a set diagram calculating process executed by the set diagram display control apparatus

Then, when the set calculating process or the set diagram calculating process is thus selected and set, the CPU 2 shifts its control to the set calculating process shown in FIGS. 7 and 9, or to the set diagram calculating process shown in FIGS. 7 and 13 (step S208).

FIG. 7 is a flow chart of a process (such as inputting the elements of each of the sets to the list) common to the set calculating process and the set diagram calculating process executed by the set diagram display control apparatus 1.

Figure 8A:
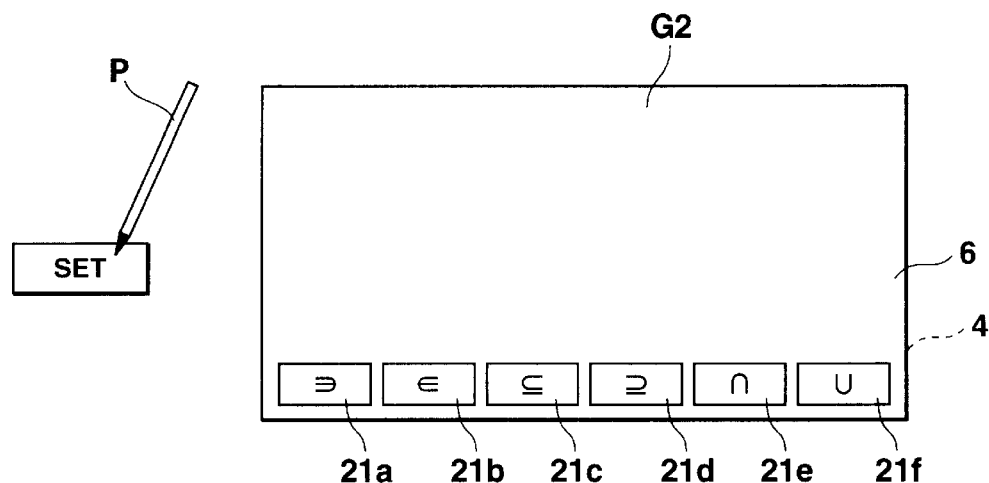
FIGS. 8A and 8B each show setting of a set mode and execution of calculation regarding the input set expression, respectively, in a set calculation input picture G2 in the set calculating process performed where a set list is set.

First, when the set calculating mode is selected by toughing the "SET" icon in the tablet 4 with the input pen P in the set process menu picture G1, the CPU 2 sets at "1" the set process flag F set in the set process flag memory 803 of the RAM 8 and displays the set calculation input picture G2 for performing the set calculating process (FIG. 8A). Then, in the state where the set calculation input picture G2 is displayed on the display unit 6, the CPU 2 determines whether the "LIST" key 3e of the input unit 3 and is operated and hence there is an instruction to display the list input picture (FIG. 3) (step S301). If so (step S301: Yes), the CPU 2 displays the list input picture via the display driver 7 on the display unit 6 (step S302), and sets at "1" the list display flag N set in the list display flag memory 804 (step S303).

Then, the CPU 2 confirms whether the list inputting picture is displayed (list display flag N=1) (step S304). If so (step S304; Yes), the CPU monitors input of data to the list input picture (step S305). When the elements of each of sets are input to the cursor indicated position displayed in an inverted manner on the list input picture (step S306), the CPU 2 counts the input element counts input of the respective sets (step S307), stores the elements and element counts of the respective sets as corresponding list data in the list data memory 806 of the RAM 8 (step S308), and displays them on the display unit 6, via the display driver 7 (step S309).

After the respective elements of the sets are input and stored as the list data to and in the list as described above, and then a combination of sets is specified by selection of one of the sheets (1, 2, 3) (step 310; Yes), the CPU 2 sets and stores the selected sheet number in the selected list data memory 807 of the RAM 8 (step S311).

Then, when the "EXIT" key 3d of the input unit 3 is operated (step S312; Yes), the CPU 2 determines whether the list display flag N of the list display flat memory 804 in the RAM 8 is "1" or not (step S313) If the list display flag N is "1", the CPU resets the flag at "0" (step S314), closes the list input picture displayed on the display unit 6, and the displays the set calculation input picture (FIG. 8A) (step S315). Then, the CPU 2 determines whether a set list is selected and set in the selected list data memory 807 (step S316).

If the CPU 2 determines that in the selected list data memory 807 a sheet number, for example, of "1" is stored and that a combination of sets for a sheet number "1" in the list data memory 806 is set (step S316; Yes), the CPU 2 displays the element count of each of the sets in the set list (step S317). Further, the CPU 2 displays a predetermined displayable number of elements of each of the sets in the set list (step S318). That is, if the count of elements of a set to be displayed is large and all the elements of the set can not be displayed in one row, only the displayable elements of the element are displayed in its displayable range.

Figure 8B:
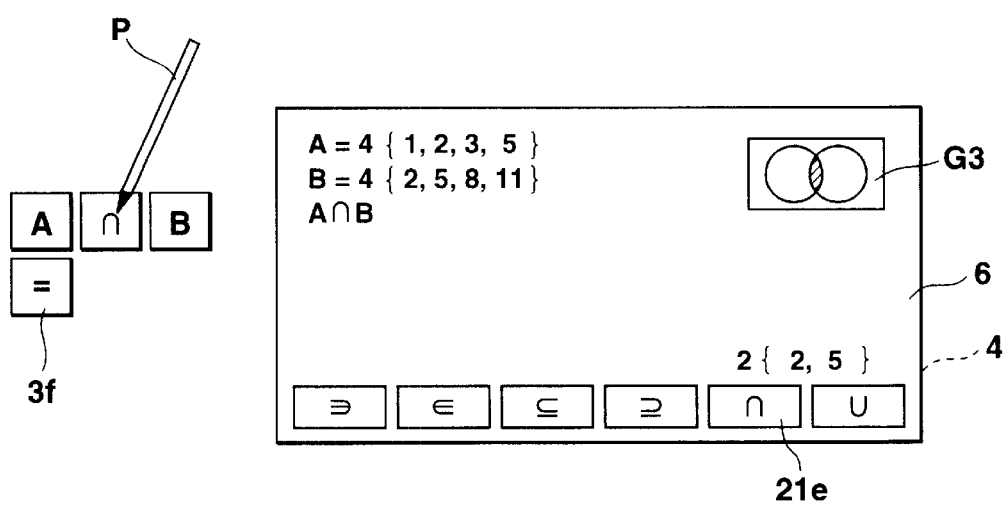

FIG. 8A shows an example of the set calculation input picture G2 initially displayed on the display unit 6 when the set calculating mode is selected. FIG. 8B shows an example of display of the elements and element count of each set input to each of the set lists, and a set relation diagram G3.

When the set mode is selected and set and, further, the set calculating mode is selected and set by a touch of the input pen P on the "SET" key in the set process menu picture G1 (FIG. 6B), in the mode selection picture G (FIG. 6A), the CPU 2 displays the set calculation input picture G2 in which the respective set symbols 21a–21f shown in FIG. 8A are arranged. When in the set calculation input picture G2 an instruction to the CPU to display the list input picture is input by the operation of the "LIST" key 3e of the input unit 3, the list input picture shown in FIG. 3 is displayed. When the elements {1, 2, 3, 5} and {2, 5, 8, 11} are then input of the sets A and B in the list input picture shown in FIG. 3, the CPU 2 counts the elements of each of the sets A and B and stores the input elements of the sets and the element counts, which are each a"4", in the list data memory 806 of the RAM 8.

Further, when a combination of the sets is specified by selection of one of the sheets (1, 2, 3), the CPU 2 sets and stores a selected sheet number in the selected list data memory 807 of the RAM 8. Subsequently, the CPU 2 closes the list input picture in response to the operation of the "EXIT" key 3d of the input unit 3 and, as shown in FIG. 8B, then displays the elements and element counts of the respective sets stored in the list data memory 806 as "A=4 {1, 2, 3, 5}", "B=4 {2, 5, 8, 11}" via the display driver 7 on the display unit 6.

Then, in the set calculation input picture in which the elements and element count of of each of the sets A and B are displayed as shown in FIG. 8B, the CPU 2 refers to the set process flag F set in the set process flag memory 803 of the RAM 8 to determine whether the set process flag F is "1" or not (step S319 in FIG. 7). When the CPU 2 determines that the set process flag F is "1", the CPU 2 starts a set calculating process (step S319; Yes in FIG. 7).

FIG. 9 is a flow chart of the set calculating process.

In the set calculating process, the CPU 2 first determines whether the data input key 3a of the input unit 3 has been operated (step S401). Then, if the data input key 3a has been operated (step S401; Yes), the CPU 2 further determines whether the input data is a set expression data containing set symbols such as "A∩B" or "A∪B" (step S403). The set symbols are those used for set operation such as a symbol "∩" indicative of a common set and a symbol "∪" indicative of a sum set.

For instance, when a set expression involving the sets A and B is input as "A∩B" (step S402), the CPU 2 determines that a set symbol is present. When the set symbol "A∩" is input (step S403; Yes), successively determines that the set relation is a common set to "A" and "B" when "A∩B" is input (step S404; Yes), and stores then the set relation data in the set relation data memory 812 of the RAM 8.

Then, the CPU 2 determines whether a set list regarding the sets A and B is set or not (step S405). If so, the CPU 2 reads out the element count of each of the sets A and B stored in the list data memory 806, and determines the sizes of circles indicative of the sets in accordance with the ratio "4:4" in element count (step S406). In this case, since the ratio in element count is "4:4", the CPU 2 reads out circular diagrams of the same diameter from the basic set diagram ROM 9 (step S407) and displays on the window of the display unit 6 the set relation diagram G3 (FIG. 8B) corresponding to the input expression "A∩B" based on the set relation data stored in the set relation data memory 812, via the display driver 7 (step S408).

Then, as shown in FIG. 8B, when the "=" key 3f of the input unit 3 is operated (step S409; Yes), the CPU 2 reaches for a set list corresponding to the set expression "A∩B" in the list data memory 806 (step S410), determines whether the set expression has set symbols or not (step S411), and whether a list corresponding to the sets A and B is present or not (step S412), in order to make a set calculation corresponding to the input set expression "A∩B".

If the set symbol is present in the set expression (step S411; Yes), and the set lists corresponding to the set lists A and B are present (step S412; Yes), the CPU 2 first determines whether the set symbol is "∩" indicative of a common set or not (step S413). If so, the CPU 2 retrieves elements {2, 5} common to the sets from the corresponding set lists A and B, and stores the elements {2, 5} and the element count "2" in the ∩ data memory 810 of the RAM 8 (step S414).

Then, the CPU 2 arranges {2, 5} retrieved and stored as the elements of the common set to the sets A and B in numerical order (step S415), additionally stores elements {2, 5} and the element count "2" in correspondence to the input set expression "A∩B" in the set list (sheet number "1") set in the list data memory 806 (step S419), and displays them as "2 {2, 5}" on the display unit 6 (step S420).

On the other hand, if the set symbol is not "∩" indicative of the common set in the determination of the set symbol at step S413 (No), the CPU 2 further determines whether the set symbol is "∩" indicative of a sum set or not (step S416) For instance, if the expression is input as "A∪B" (step S416; Yes), the CPU 2 reads out all the elements of the sets "A={1, 2, 3, 5}" and "B={2, 5, 8, 11}" from the corresponding set list stored in the list data memory 806, deletes one of common elements to in the ∪ data memory 811 them and stores the elements "{1, 2, 3, 5, 8, 11}" and element count "6" of the sum set of the sets A and B (step S417).

In response to this operation, the CPU 2 arranges ∪ elements {1, 2, 3, 5, 8, 11} retrieved and stored as the elements of the sum set of the sets A and B in numerical order (step S418), and additionally stores the elements {1, 2, 3, 5, 8, 11} and the element count "6" in correspondence to the input set expression "A∩B" in the set list (sheet number "1") set in the list data memory 806 (step S419). Then, the CPU 2 displays "6 {1, 2, 3, 5, 8, 11}" via the display driver 7 on the display unit 6 (step S420).

Then, an example of the set calculating process performed where the set elements are not input to the set list and only the set expression "A∩B" is input to the set calculation input picture G2 will be explained specifically referring to FIGS. 9 and 10.

Figure 10A:
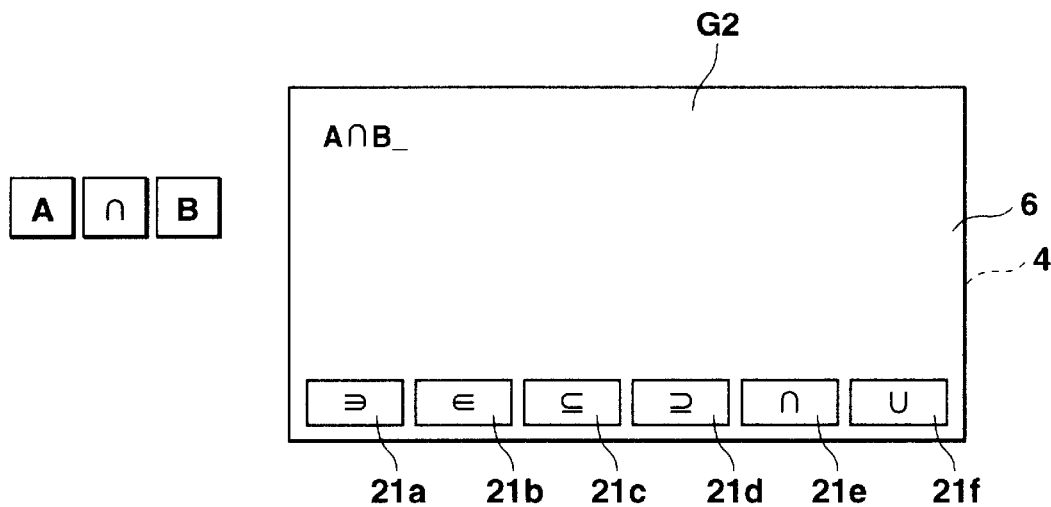
FIGS. 10A and 10B show examples of an input set expression and its set relation diagram, respectively, on a set calculation input picture G2 in a set calculating process performed where a set list is not set.

FIGS. 10A and B each show the set expression "A∩B" input in the set calculation input picture G2 and a displayed set relation diagram G3 for the set expression "A∩B", respectively, in the set calculating process in which the set elements are not input to the set list.

Assume now that no set list is set in the list data memory 806 and no sheet number is set in the selected list data memory 807 when the CPU 2 shifts its control to the set calculating process (set process flag F="1"). In this case, if the set expression, for example, "A∩B" is input (step S402) by operating the data input key 3a of the input unit 3, as shown in FIG. 10A (step S401) in a state where the set calculation input picture G2 is displayed on the display unit 6 by operating the "EXIT" key 3d (step S312–step S316 in FIG. 7), the CPU 2 determines that the set symbol is present the instance the set symbol "A∩" is input (step S403; Yes), successively determines that the set relation is a common set to the sets "A" and "B" the instance "A∩B" is input (step S404; Yes), and stores the set relation data in the set relation data memory 812 of the RAM 8.

Figure 10B:
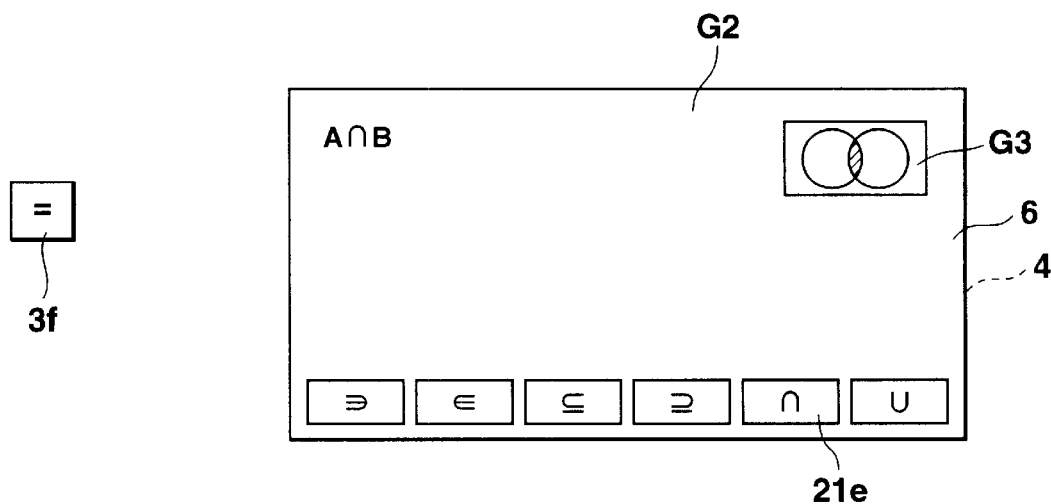

Then, the CPU 2 determines whether the set list is set or not (step S405). In this case, the CPU 2 determine that the set list is not set (step S405; No), reads out a basic set diagram indicative of a the common set to the two sets A and B from the basic set diagram ROM 9a in accordance with the set relation data stored in the set relation data memory 812 (step S407), and displays a set relation diagram G3 corresponding to the set expression "A∩B" on the display unit 6, as shown in FIG. 10B (step S408).

Then, when the key "=" key 3f of the input unit 3 is operated (step S490; Yes), the CPU 2 searches for a set list corresponding to the input expression "A∩B" (step S410). In this case, the CPU 2 determines at step S412 that the corresponding list is not pre sent (step S412; No), Further, the CPU 2 determines whether the appropriate set expression has an expandable composition or not (step S421). The expansion of the set expression means that the set expression is changed to another one by utilizing a commutative law, associative law or distributive law for the sets. For instance, it means that an expression input as "A∩(B∩C" is changed to "(A∩B)∪(A∩C)" in accordance with the distributive law of the set expression. The expansion of the set expression includes an element count calculating expression for calculation of the element count of each of the sets, for example, a changed expression such as n(A∪B)=n(A)+n(B)−n(A∩B).

In this example, since the input set expression is "A∩B", the CPU 2 determines that it is unexpandable (step S421; No) and the displayed set expression is not changed. On the contrary, if the set expression is expandable (step S421; Yes), resulting the expanded expression is displayed (step S422).

Then, the set calculating process performed when the elements of each of the sets are not input to the set list and a set expression other than the example "A∩B" described above is input will be described.

Figure 11A:
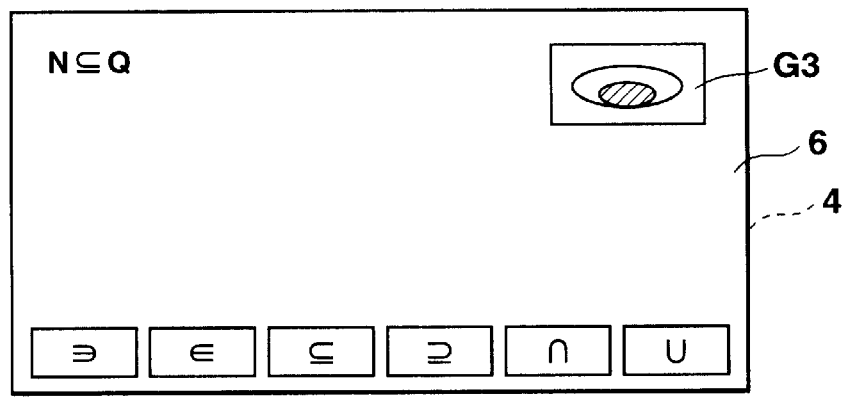
FIGS. 11A, 11B and 11C show displayed examples of a set relation diagram G3 of a subset, a set relation diagram G3 of a sum set G3 and a set relation diagram G3 of a complementary set, respectively, on the set calculation input picture G2 in a set calculating process performed where a set list is not set.
Figure 11B:
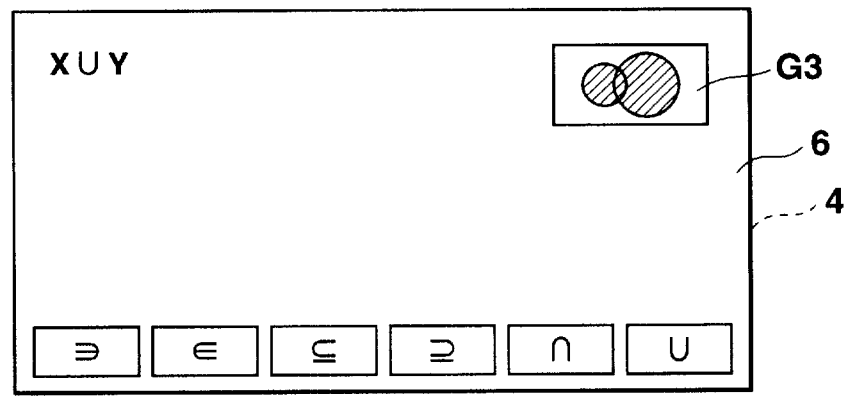
Figure 11C:
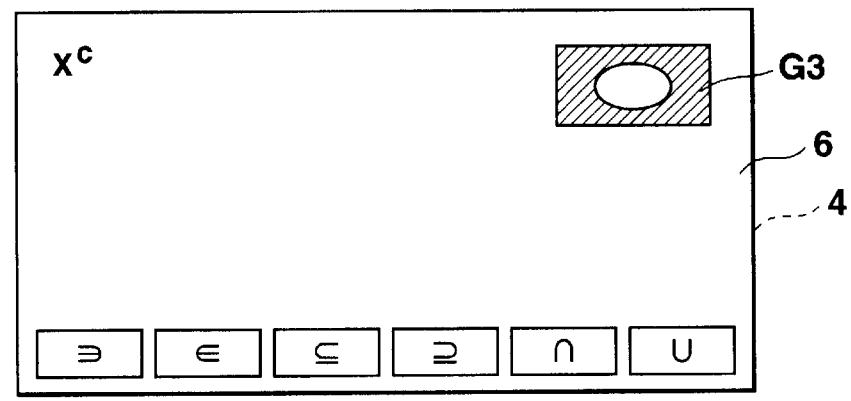

FIGS. 11A, B and C show examples of set diagrams corresponding respectively to the input set expressions where no set list is input. More specifically, FIG. 11A shows an example of a subset expression "N⊆" and a corresponding set relation diagram G3, FIG. 11B an example of a sum set expression "X∪Y" and a corresponding set relation diagram G3, and FIG. 11C an example of a complementary set expression "X$^c$" and a corresponding set relation diagram 13.

In a state where no set list corresponding to the set expression is set, the CPU 2 reads the set diagram corresponding to the input set expression via steps S401–S405, S407 and S408 as described above, from the basic set diagram ROM 9a and displays the same on the display unit 6.

Furthermore, the set diaphragm display control apparatus 1 calculates and displays element counts corresponding to the input set expression, and also displays corresponding set diagrams.

Figure 12A:
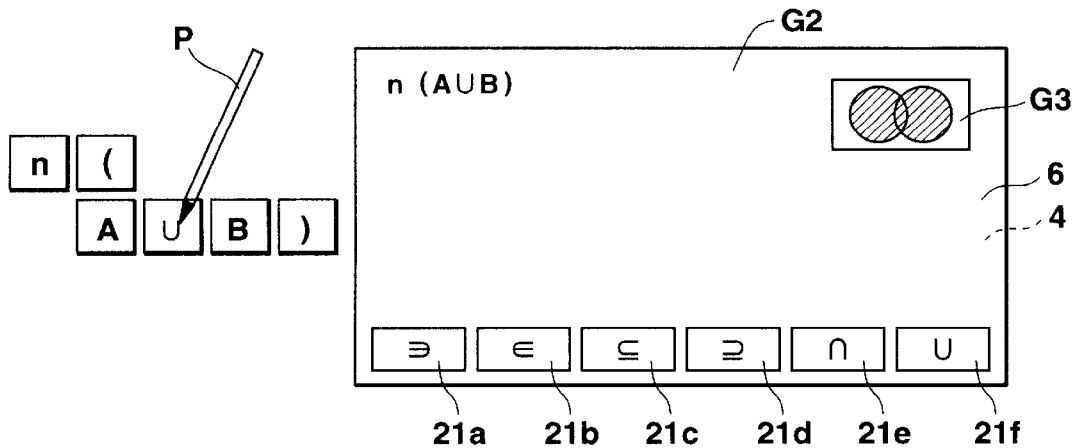
FIGS. 12A, 12B and 12C show on a set calculation input picture G2 an input element count calculating expression, a result of calculation performed where a list is set, and a result of calculation performed where the set list is not set, respectively.

FIGS. 12A, B and C sequentially show respective steps to obtain a displayed calculated element count of a set in the set calculating process.

In the set calculating process (set process flag F=1), if the data input key 3a of the input unit 3 is depressed to input, for example, an element count calculating expression "n(A∪B)" (step S402) as shown in FIG. 12A, in a state where the sheet number "1" is set as the corresponding set list in the selected list data memory 807 of the RAM 8, the CPU 2 determines that the set symbol is present the instance the set symbol "n(A∪" is input (step S403: Yes), successively determines the set relation as a sum set for "A" and "B" the instance the expression "n(A∪B)" is input (step S404), and stores the set relation data in the set relation data memory 812 of the RAM 8.

The CPU 2 determines whether the set list regarding the sets A and B is input and the corresponding set list is set or not (step S405). If so, the CPU 2 determines the sizes of circles indicative of the sets based on the ratio "4:4" in element count of set A to set B (step S406). Since the ratio in element count is "4:4" in this case, the CPU 2 reads out circular set diagrams of the same diameter size from the basic set diagrams stored in the ROM 9 (step S407), and displays on the display unit 6 the set relation diagrams corresponding to the input expression "n(A∪B)" based on the set relation data stored in the set relation data memory 812, via the display driver 7 (step S408).

Figure 12B:
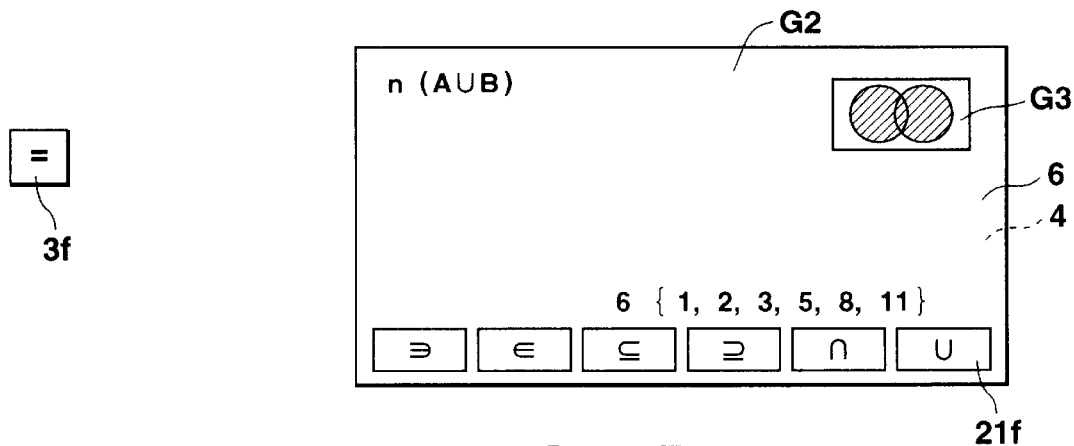

Then, in order to calculate an element count corresponding to the input element count calculating expression "n(A∪B)", the CPU 2 retrieves a set list corresponding to the element count calculating expression (step S410) when the "=" key 3f of the input unit 3 is depressed as shown in FIG. 12B (step S409; Yes), and determines whether the set symbol "∪" is present or not (step S411) and whether the set lists corresponding to the sets A and B are present or not (step S412).

Then, when the CPU 2 determines that the corresponding set list is set (step S412; Yes) and the input expression "n(A∪B)" is an element count calculating expression (step S416; No, step S423; Yes), the CPU 2 calculates the element count "6" of a sum set for the set A {1, 2, 3, 5} and the set B {2, 5, 8, 11} (step S424) and displays the result of the calculation as "6 {1, 2, 3, 5, 8, 11}" on the display unit 6 as shown in FIG. 12B (step S420).

Figure 12C:
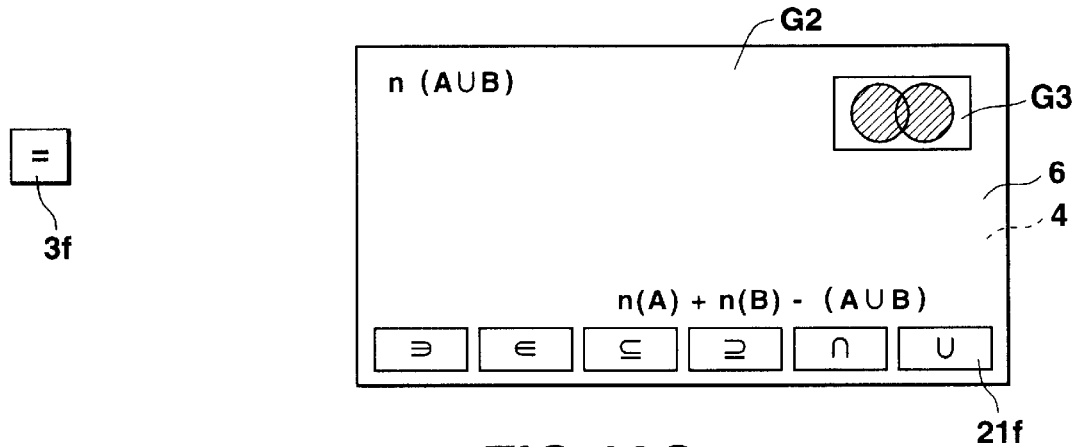

On the other hand, as shown in FIG. 12C, when the "=" key 3f is depressed (step S409), the CPU 2 retrieves a set list depending on the expression "n(A∪B)" (step S410). When the CPU 2 determines that the corresponding list for the set A and set the B is not present (step S412; No), the CPU 2 expands the input expression as "n(A)+n(B)−n(A∩B) and displays it since the input expression "n(A∪B)" is expandable (step S421; Yes) (step S422).

When the CPU 2 determines that no set symbol is present in the input set expression (step S411; No) at the depression of the "=" key 3f (step S409), the CPU 2 determines this as a general calculating expression to perform a corresponding calculating process (step S425) and displays the result of the calculation (step S426).

Next, a flow of the set diagram calculating process preformed when "SET DIAGRAM CALCULATING MODE" is selected and set by the set mode selection will be explained specifically, referring to FIGS. 13 to 15.

First, in the mode selection picture G (FIG. 6A), when the set mode is selected and, further, when the set diagram calculating mode is selected by a touch on an icon indicative of the "SET DIAGRAM" on the tablet 4 in the set process menu picture G1 (FIG. 6B), the CPU 2 sets the process flag F at "2".

FIG. 13 is a flow chart of the set diagram calculating process preformed by the set diagram display control apparatus 1. FIG. 14 shows a calculation display state (part1) of the set diagram G4 and the set relation list G5 involved in the set diagram calculating process performed by the set diagram display control apparatus 1. FIG. 15 shows a calculation display state (part2) of the set diagram G4 and the set relation restriction G5 involved in the set diagram calculating process performed by the set diagram display control apparatus 1.

First, when the CPU 2 shifts its control to the set diagram calculating process, and the "EXIT" key 3d is depressed where the sheet number of the set list is not selected and set in the selected list data memory 807 (step S312; Yes), the CPU 2 determines whether the list display flag N in the list display flag memory 804 of the RAM 8 is "1" (step S313 in FIG. 7). If so, the CPU 2 resets the flag at "0" (step S314 in FIG. 7), closes the list input picture displayed on the display unit 6, and displays the set diagram calculation input picture (step S315 in FIG. 7).

The set diagram calculation input picture has a set relation list G5 for inputting information regarding sets and a set diagram display range G4 for displaying a set diagram based on the information input to the set relation list G5, in which predetermined symbols of sets (A, B, - - - ), and set expressions such as a common set and a sum set (A∩B, A∪B, - - - ) are arranged, and the set elements and element counts can be input via the input unit 3 to the corresponding input columns (FIG. 14). It is assumed here that no set diagram is displayed on the initial picture in which no data is input to the set relation list G5.

The CPU 2 determines whether a set list is selected and set or not in the selected list data memory 807 (step S316 in FIG. 7). Then, if the CPU 2 determines that no set list is set in this instance (step S316; No in FIG. 7), the CPU 2 determines that the set process flag F of the set process flag memory 803 is "2" (step S319; No in FIG. 7) and shifts its control to the set diagram calculating process shown in FIG. 13.

In the set diagram calculating process shown in FIG. 13, the CPU 2 first determines whether the set diagram showing the relation between the sets arranged in the set relation list G5 is displayed or not on the display unit 6 (step 3501). When the CPU 2 determines that only the set relation list G5 comprising an arrangement of predetermined symbols of sets and the set expressions is displayed on the display unit 6 and the set diagram is displayed (step S501; No), the CPU 2 further determines whether the set list is set or not (step S502). When the CPU 2 determines that no elements or the like are input to the set list and the set list is not placed (step S502; No), the CPU 2 reads out basic set diagrams representing the sets A, B, C and D from the basic set diagram ROM 9a as set diagrams corresponding to the sets arranged in the set relation list G5, displays them on the display unit 6 (step S503), and sets "1" indicating that the basic set image is displayed at the basic set diagram flag T of the basic set diagram display flag memory 8 (step S504).

Returning again to the processing at step S501, the CPU 2 determines whether the set diagram is displayed or not. When the CPU 2 determines that "1" is set at the basic set diagram display flag T of the basic set diagram display flag memory 805 (step S505; Yes), the CPU 2 then monitors the operation of the input unit 3 for inputting each of the set symbols (A, B, - - - ) at the set relation list G5 (step S506). When the elements of each set and its element count are input by depressing the data input key 3a (step S507), the CPU 2 modifies enclosed areas formed by rectangular and circular diagrams in the set diagram so as to have sizes corresponding to their respective element counts and displays them (step S508).

Then, when the CPU 2 confirms that the "=" key 3f of the input unit 3 has been depressed (step S509; Yes), the CPU 2 calculates the respective elements and element counts corresponding to all sorts of set relations each comprising a combination of the sets input optionally to the set relation list G5 based on the elements and element counts of the respective sets input (step S510), temporarily stores them in the operation data memory 809 (step S511), and additionally displays them as the data corresponding to the respective set expressions in the set relation list G5 (step S512).

In this case, the elements calculated and displayed in correspondence to the set expressions on the set relation list G5 are displayed up to a predetermined number of elements displayable in the area of the set relation list G5, and no elements that can not be displayed are displayed(step S513)

On the other hand, when the CPU 2 shifts its control to the set diagram calculating process and if the "EXIT" key 3d of the input unit 3 is depressed in a state where the set list (sheet number) is selected and set in the selected list data memory 807 (step S312; Yes in FIG. 7), the CPU 2 determines whether the list display flag N in the list display flag memory 804 of the RAM 8 is "1" or not (step S313 in FIG. 7). If the list display flag N is "1", the CPU 2 resets the flag at "0" (step S314 in FIG. 7), closes the list input picture displayed on the display unit 6, and displays the set diagram calculation input picture (step S315 in FIG. 7).

In this case, the set diagram calculation input picture displays as the set relation list G5 on the display unit 6 an arrangement of the individual symbols of the sets (A, B, - - - ) stored in the set list of the list data memory 806 in correspondence to the sheet number set and stored in the selected list data memory 807, and predetermined set expressions such as represent a common set, a sum set (A∩B, A∪B, - - - ), etc., comprising a predetermined combination of those sets, and the set diagrams showing the relation between the sets arranged in the set relation list G5 (refer to FIG. 14).

Then, the CPU 2 determines whether the list of the sets is selected and placed in the selected list data memory 807 (step S316 in FIG. 7). If so, (step S316; Yes in FIG. 7), the CPU 2 displays the respective element counts of the sets stored in the placed set list in correspondence to the symbols of the sets (A, B, - - - ) in the set relation list G5 displayed on the display unit 6 (step S317 in FIG. 7) and also displays a predetermined displayable number of elements of each set (step S318 in FIG. 7).

Assume now that the elements and element counts of the three respective sets A, B, D are previously stored in the set list in the list data memory 806 corresponding to the sheet number set in the selected list data memory 807, and that the elements of the sets A and B are partially common, and all elements of the sets A and B are contained in the elements of the set D (FIG. 14).

In this case, in the set diagram calculating process of FIG. 13, the CPU 2 first determines whether the set diagram corresponding to the set relation list G5 is displayed or not on the display unit 6 (step S501) When the CPU 2 determines that only the set relation list G5 comprising symbols of the sets and an arrangement of set expressions is displayed on the display unit 6 and that no set diagram is displayed (step S501; No), the CPU 2 further determines whether the set list is set (step S502). If so, (step S502; Yes), the CPU 2 compares the elements of the respective sets A, B and D in the predetermined set list (step S514) and determines whether a set containing all the elements of other sets is present or not (step S515) In this example, the CPU 2 determines that the set D containing all the elements of the sets A and B is present (step S515; Yes), and stores the set D as a whole set in the set relation data memory 812 (step S516).

Successively, the CPU 2 repeatedly compares the elements of the respective sets A, B and D (step S514), and determines whether a set containing all the elements of other sets is present or not (step 515). When the CPU 2 determines that a set containing all the elements of other sets is not present any longer (step 5515; No), the CPU 2 then determines whether or not a set is present which has elements partially common to those of other sets (step S517) In this example, the CPU 2 determines that elements partially common to those of the set A and the set B are present, sets the sets A and B as a common set (step S518) and stores same in the set relation data memory 812.

Further, if the CPU 2 determines that no sets having partially common elements are present (step S517; No), the CPU 2 sets them as separate ones (step S519) and stores them in the set relation data memory 812.

Then, when the analysis of each of the set relations in the set list has been completed (step S520; Yes), the CPU 2 depicts set diagrams based on the data indicative of the relation between the sets stored in the set relation data memory 812.

Figure 14A:
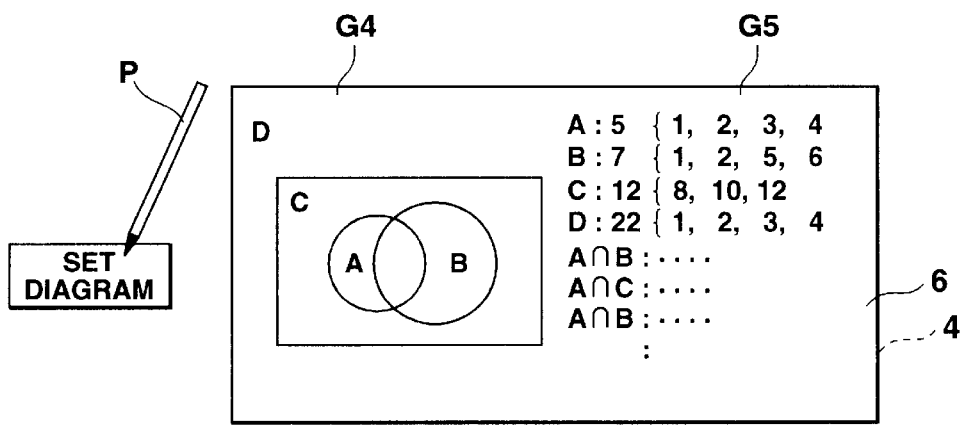
FIGS. 14A and 14B show the elements and element count of each of sets input to a relation list G5 and a result of calculation of a set relation based on the input elements and element counts of the sets, respectively, in the set diagram calculating process (part 1)
Figure 14B:
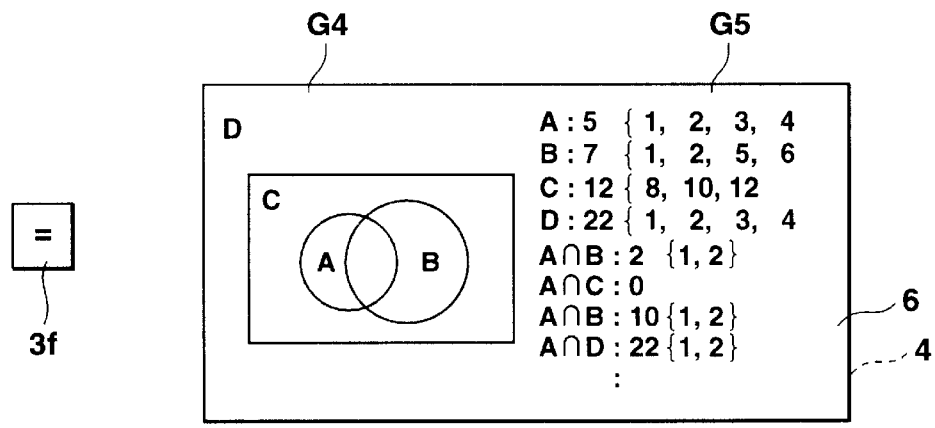

That is, as shown in FIG. 14A, the CPU 2 displays a rectangular diagram for the whole set together with a symbol D (step S521), and then displays together with a symbol B the set B having a maximum element count contained in the whole set D as a circular diagram with a predetermined radius of r (step S522).

In response to this operation, the CPU 2 displays a circular diagram for the set A with a radius obtained by reducing the radius of r of the circular diagram for the set B at a ratio in element count of the set A to B to thereby display a common set involving the sets A and B (step S523).

Then, after completing the depiction of the set diagram corresponding to the placed set list (step S524), the CPU 2 detects the elements contained only in the whole set D (step S525), and stores them as a set C together with its element count in the corresponding set list in the list data memory 806 (step S526), and additionally displays the element count and elements of the set C in a displayable range in the set relation list G5 (step S527 and S528).

Subsequently, when the CPU 2 determines at step S501 that a diagram is displayed (step S501; Yes) and detects depression of the "=" key 3f of the input unit 3 (step S500; Yes) in the set diagram calculating process, as shown in FIG. 14 (B), the CPU 2 calculates, based on the elements of each of the set lists A, B, C, D stored in the corresponding set list in the list data memory 806, the elements and the element count of each of all of other set relations (A∩B, A∩C, A∪B, - - - ) (step S510), additionally stores them in the set list (step S511), and additionally displays them within a displayable range in the set relation list G5 (steps S512, S513).

Assume now that the elements of the respective three sets A, B and C are previously stored as "A: [1, 2, 3, 5), B: {2, 5, 8, 11}, C: {1, 2, 3, 4, 5, 6, 7, 8, 11}" in the set list in the list data memory 806 corresponding to the list number set in the selected list data memory 807 and that the elements of the sets A and B are partially common to each other, and all of the elements of the sets A and B are contained in the elements of the set C (FIG. 15).

In this case, when the CPU 2 first determines that no set diagram is displayed (step S501; No) and further that the set list is placed (step S502; Yes) in the set diagram calculating process in FIG. 13, the CPU 2 compares the elements of the respective sets A, B and C in the placed set list (step S514). At first, the CPU 2 determines that a set containing the elements of other sets, namely, a set C containing all of the elements {1, 2, 3, 5. 8. 11} of the sets A and B, is present (step S515; Yes), sets the set C as a whole set (step S516), and stores the same in the set relation data memory 812.

Successively, when the CPU 2 repeatedly compares the elements of the respective sets (step S514), and the CPU 2 determines that the sets A and B are partially common to each other for the elements {2, 5} (step S517; Yes), the CPU 2 sets the sets A and B as a common set (step S518), and stores the same in the set relation data memory 812.

Further, if there are other independent sets (step S517: No), the CPU 2 sets or places them as separate ones (step S519), and stores the same in the set relation data memory 812.

Figure 15A:
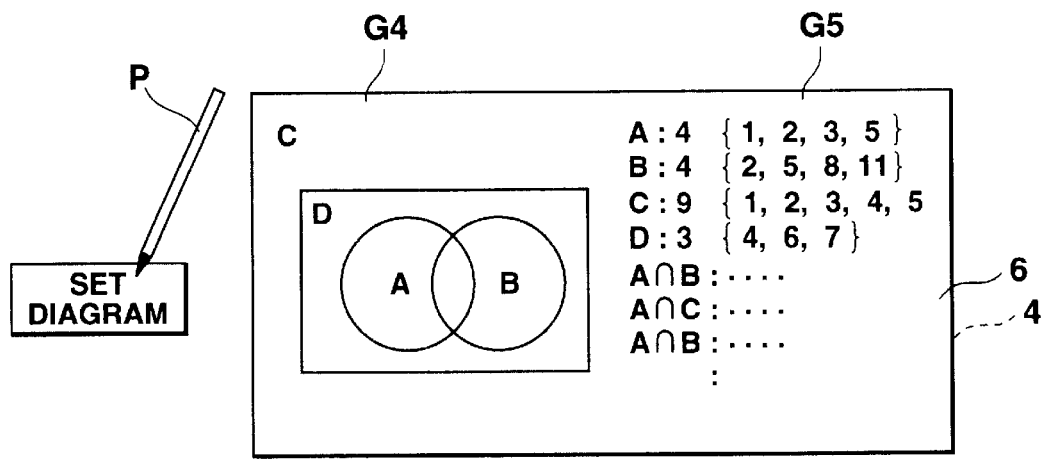
FIGS. 15A and 15B show the elements and element count of each of sets input to a relation list G5 and a result of calculation of a set relation based on the input elements and element counts of the sets, respectively, in the set diagram calculating process (part 2)

Then, when the analysis of each of the set relations in the set list is completed (step S520; Yes), the CPU 2 depicts and displays set diagrams based on the data indicative of the relation between each of the sets stored in the set relation data memory 812. At first, as shown in FIG. 15A, the CPU 2 displays a rectangular diagram for the whole set C together with symbol C (step S521), and then displays the set A or B of the maximum element count "4" contained in the whole set C as a circular diagram with a predetermined radius r together with symbol A or B (step S522).

In this case, when the circular diagram for the set A is displayed earlier than that for the set B, the CPU 2 displays the circular diagram for the set B as having the same radius r as the circular diagram for the set A in view of the ratio in element count of the set A to B being 4:4 to thereby display a common set for the sets A and B (step S23).

Then, when the CPU 2 completes the depiction of the set diagrams corresponding to the set list (step S524; Yes), the CPU 2 detects the elements {4, 6, 7} contained only in the whole set C (step S525), stores them together with its element count "3" as a set D in the corresponding set list in the set list memory 806 (step S526), and additionally displays the element count and contents of the elements "3 {4, 6, 7}" of the set D in a displayable range in the set relation list G5 (steps S527 and S528).

Figure 15B:
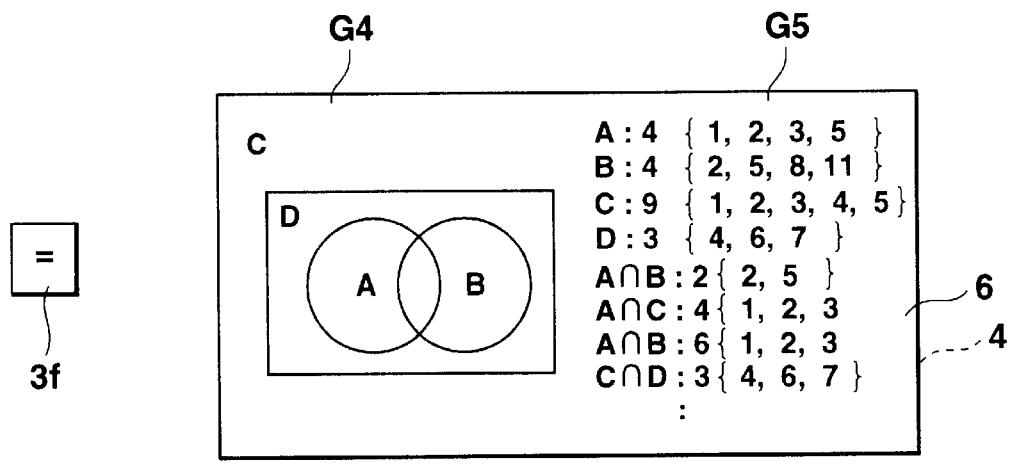

Subsequently, in the set diagram calculating process in FIG. 13, the CPU 2 determines that the set diagrams are displayed (step S501; Yes). Thus, when the "=" key 3f is depressed, as shown in FIG. 15B (step S509; Yes), the CPU 2 calculates the elements and element count of each of all the other set relations (A∩B, A∩C, A∪B, - - - ), based on the element data of each of the sets A, B, C, D set in the corresponding set lists in the list data memory 806 (step S510), additionally stores the results of the calculation in the set list (step S511) and additionally displays them in a displayable range as the set relation list G5 (steps S512, S513).

As described above, when any set expression "A∩B" is input in the set calculating process performed by the set diagram display control apparatus in the first embodiment, the CPU 2 displays it on the display unit 6, and displays diagrams indicating a set relation corresponding to the input set expression. Further, when the elements and element count of each of the sets A and B in the set expression are previously stored and placed as a set list in the list data memory 806 by depressing the "=" key 3f, the CPU 2 retrieves common elements corresponding to the set expression in accordance with each of the set elements in the placed set list, additionally stores them in the set list and displays them on the display unit 6. Further, if the input set expression is an element count calculating expression "n(A∪B), the CPU 2 calculates the elements and element count of a sum set for the sets A and B and displays them on the display unit 6. Further, if no corresponding set list is placed, the CPU 2 displays an expanded expression "n(A)+ n(B)−n(A∩B)" for the input set expression "n(A∪B)" on the display unit 6.

Further, if a set list is placed in the list data memory 806 in the set diagram calculating process performed by the set diagram display control apparatus 1, the CPU 2 compares the elements of the respective sets A, B, - - - stored in the set list, determines the relation between the sets, stores the same in the set relation data memory 812, displays the relation between each of the sets based on the set relation data memory 812 as a set diagram comprising a combination of rectangular and circular diagrams each having a size corresponding to the ratio in element count of the respective sets, calculates the elements and element count of each of the relations of all sorts of combinations between each of the sets, and displays them on the set relation list G5 together with the elements and element count of each of the sets stored in the placed set list.

Accordingly, when a set expression is input, the set relation indicated by the input set expression is displayed as an image, and the elements and element count thereof are calculated and displayed. Further, set diagrams corresponding to a combination of a plurality of sets and their relation are displayed together with the specified elements and element count of the relation.

[Second Embodiment]

Referring to FIGS. 16–18A,B,C, a second embodiment of the set diagram display control apparatus according to the present invention will be described next. An element of the second embodiment which is similar to a corresponding one of the first embodiment is identified by the same reference numeral as is used to identify that corresponding element of the first embodiment.

While the radii of circles of the set diagrams displayed in the set diagram calculating process in the first embodiment are determined at the ratio of the element counts of the sets whereas in a set diagram display process performed by a set diagram display control apparatus of the second embodiment, the radii of circles indicative of sets and their central coordinates are changed depending on the respective input element counts of the sets and the element count of a common set to the sets so that the set diagrams go in the display picture in the set diagram display process (AG.17) to be described later.

That is, when the elements of each set or its element count is input to a set relation list column G5 in the set diagram display process (FIG. 17), the CPU 2 calculates the element count of each of all calculable relations between the sets based on the input elements or element count Of that set, determines a range of display of the set diagrams in accordance with the input or calculated element counts, and the positions/sizes of circular and rectangular diagrams which constitute the set diagrams within the displayed range, and displays the set diagrams at and in the determined display positions and sizes.

Figure 16:
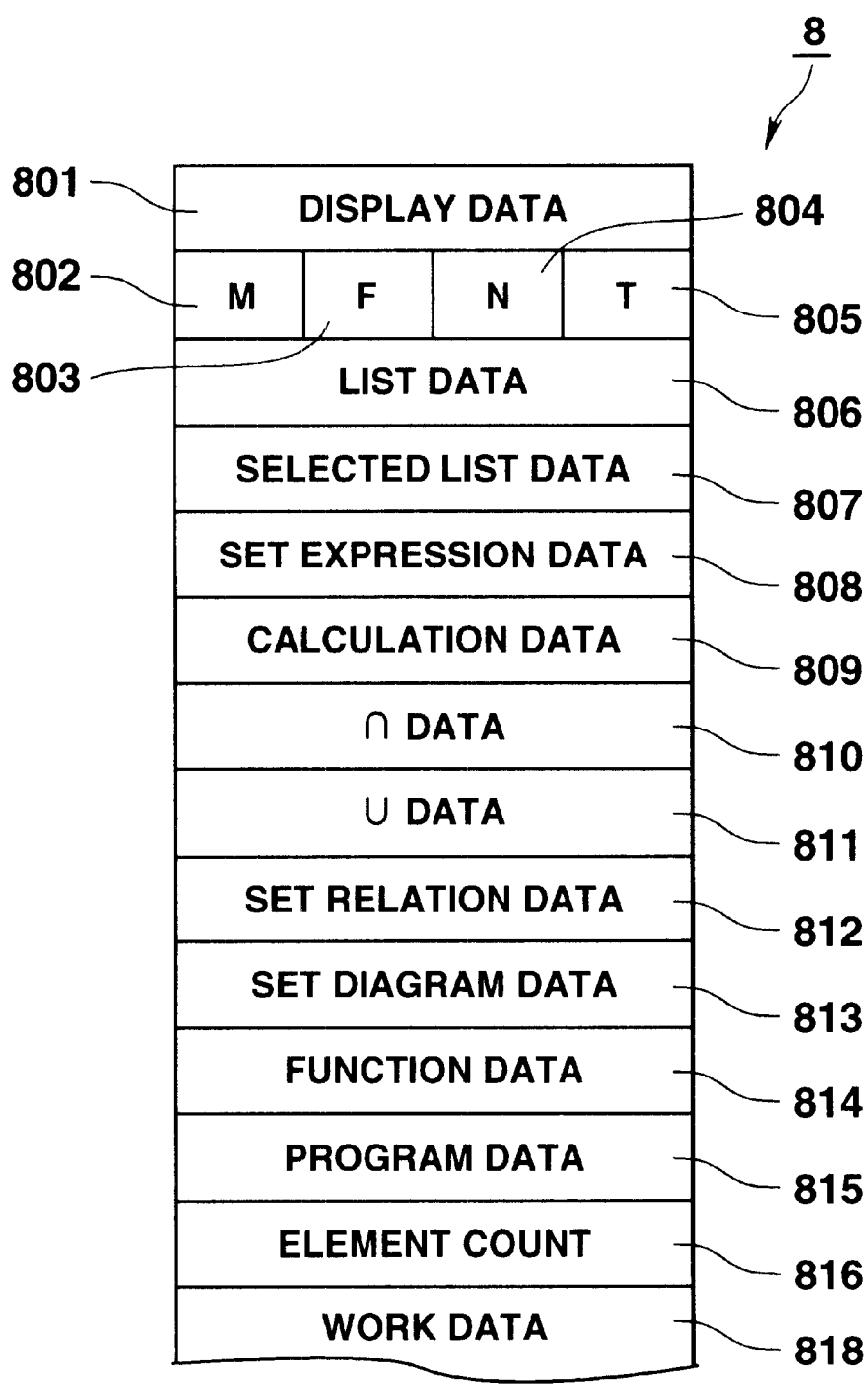
FIG. 16 shows the composition of a memory set in a RAM 8 of a second embodiment.

FIG. 16 illustrates the composition of the RAM 8 of the set diagram display control apparatus 1 of the second embodiment. The RAM 8 contains an element count data memory 816 in addition to the elements of the RAM 8 of the first embodiment. The element count data memory 816 stores the element count of each set or the relation between the sets (common set, sum set, complementary subset, etc.).

Figure 17:
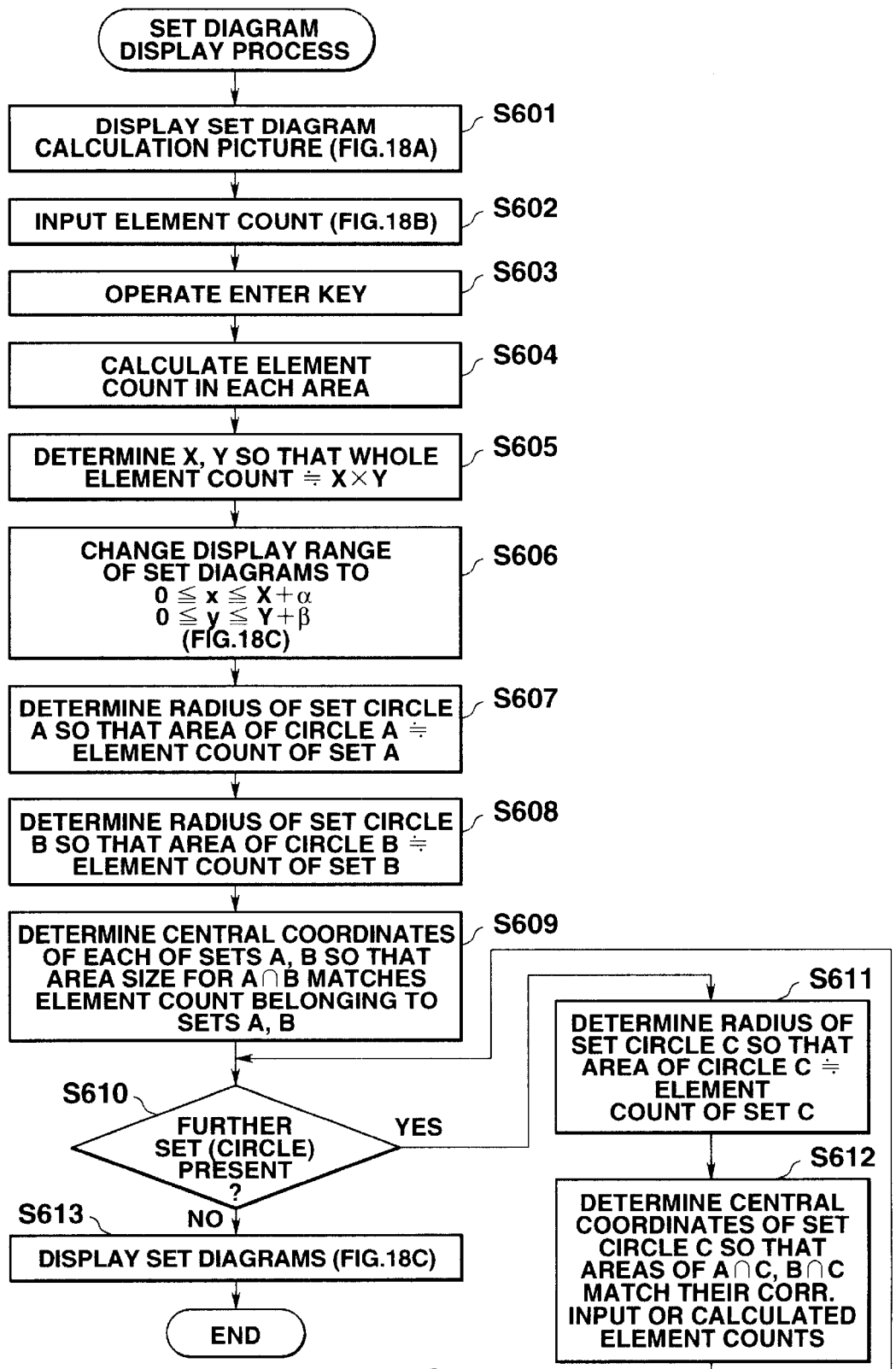
FIG. 17 is a flow chart of a set diagram calculating process executed by the set diagram display control apparatus 1.
Figure 18A:
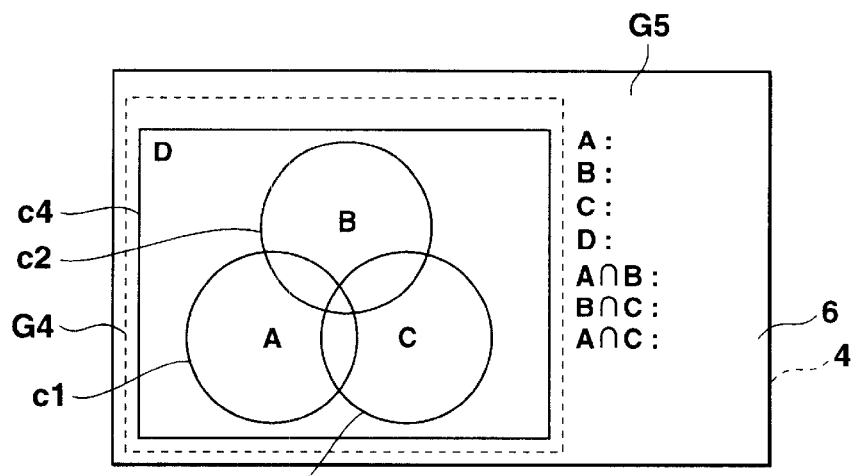
FIGS. 18A, 18B and 18C show an initial display example of a set diagram calculation input picture, element counts of sets input to the set relation list CS, and the display positions and sizes of the set diagrams changed in accordance with the input element counts, respectively, in the set diagram display process.

Operation of the second embodiment will be described next. FIG. 17 is a flow chart of the set diagram display process performed by the set diagram display control apparatus 1 of this embodiment. FIGS. 18A, B and C each show a set diagram, a set expression, its solution, etc., displayed in the set diagram display process.

First, when a set diagram calculation mode is set in the whole process of FIG. 4 and the set mode process of FIG. 5, the CPU 2 reads a set diagram calculation input picture contained in the ROM 9 and displays it on the display unit 6 (step S601 of FIG. 17). The set diagram calculation input picture contains a rectangular diagram c4 indicative of a whole set, circular diagrams c1, c2, and c3 indicative of sets A, B and C, respectively, in a set diagram display area G4, and a set relation list region G5 provided to the right of the picture to which information on the respective sets A, B, C . . . is input.

Input to the set relation list region G5 is the element count of each of the whole set, sets (A, B, C, . . . ), common sets (A∩B, B∩C, . . . ), sum sets (A∪B, B∪C, . . . ) by operating data input keys 3a of the input unit 3 (step S602). When execution of calculation is instructed by the "enter" key 3c (step S603), the CPU 2 calculates the element count each of all the set relations from the element count of each of the input sets (step S604).

When there are no elements input to the set list and only the element count of each set is input to the set relation list G5 as in this example, the CPU calculates the element counts of all the set relations such as, for example, the element count of a complementary set involving the sets A, B and C, a common set (A∩B∩C,) involving the sets A, B and C, . . . , from the element counts of the respective input sets. When the element count of each of those sets is input (step S602), the CPU 2 may display a list input picture (FIG. 3) so that the elements of each set may be input to a corresponding set sublist. In this case, the CPU 2 calculates the element count of each set based on the elements of that set input to the corresponding set list, and then calculates the element count of each of the common set, sum set, complimentary set, etc.

The CPU 2 stores the calculated element count of the sets in correspondence to a set expression indicative of its set relation in a element count data memory 816 of the RAM 8.

Then, the CPU 2 determines the display range of the set diagram. An initial set diagram of the set diagram calculation input picture displayed on the display unit 6 is a basic set diagram which does not correspond to the input element count of the set. Thus, the CPU determines a set diagram display range G4 so that a rectangular diagram c4 indicative of the whole set goes in the display picture, that is, so that a product of a maximum width value X and a maximum height value Y of the rectangular diagram c4 indicative of the whole set substantially represents the element count of the whole set. For example, if the element count of the whole set is 50, the CPU 2 determines that the maximum width value X is 10 and the maximum height value Y is 5 (step S605).

Figure 18B:
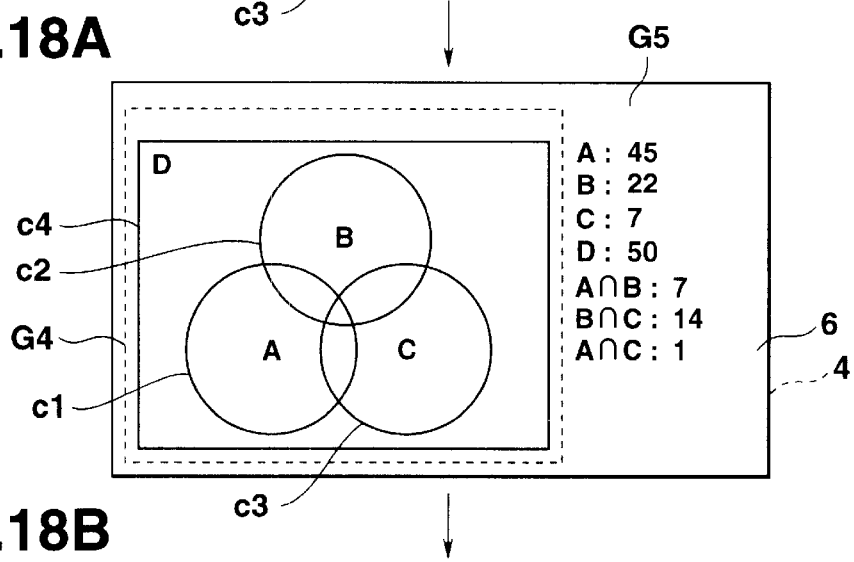
Figure 18C:
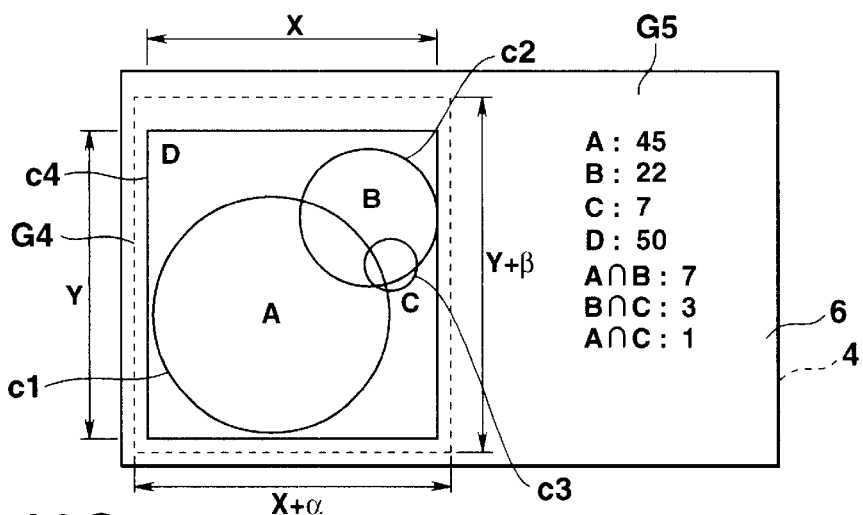

The CPU 2 further changes the set diagram display range G4 so that $0 \leq x \leq X+\alpha$ for the width, $0 \leq y \leq +Y+\beta$ for the height where $\alpha$ and $\beta$ each represent a margin of the set diagram display range G4 (step S606). By changing the set diagram display range G4 like this, the rectangular diagram c4 indicative of the whole set is necessarily displayed within the set diagram display range G4 of the display picture (FIG. 18C).

In addition, the CPU 2 determines a radius of the circle c1 indicative of the set A so that the area of the circle c1 coincides with the element count of the set A (step S607), and a radius of the circle c2 indicative of the set B so that the area of the circle c2 indicative of the set B coincides with the element count of the set B (step S608). The CPU 2 then determines the coordinates of centers of the circles c1 and c2 of the sets A and B so that the area of a common set (A∩B) involving the sets A and B coincides with the input or calculated element count of the common set (A∩B) involving the sets A and B (step S609).

Then, the CPU 2 determines whether or not data such as the element count of a second set (for example, C) is input to the set relation list G5 or a set list of the list input picture corresponding to the second set (step S610). If so, the CPU determines a radius of a circle c3 indicative of the second set C so that the area of the circle c3 matches the element count of the second set (step S611), and determines the central coordinates of the circle c3 so that the areas of the common sets A∩C and B∩C of the sets C and A, and C and B match the input or calculated element count of the common sets (step S612).

Thereafter, if there are no more sets, the CPU 2 displays on the display unit 6 the circular diagrams C1, C2 and C3 indicative of the respective sets A, B and C with the calculated radii and central coordinates (step S613).

FIG. 18A illustrates a basic set diagram read out from the basic set diagram ROM 9a, and a set diagram calculation input picture including a set relation list G5 displayed by the set diagram process. FIG. 18B illustrates the element count of each of the sets input to the set relation list region G5 in FIG. 18A. FIG. 18C illustrates a size of a rectangle c4 indicative of the whole set, and the radii and central positions of the circles c1, c2 and c3 indicative of the respective sets A, B and C, changed depending on the corresponding numbers of elements of the sets in the set diagram display process.

When the set diagram calculation mode is set, the CPU 2 reads and displays the set diagram calculation input picture stored in the ROM 9, as shown in FIG. 18A, in which the set diagram display range G4 which displays the set diagrams and a set relation list G5. The set diagrams contain overlapping circles c1–c3 of the same radius and a rectangle c4 which encloses the three circles, read out from the basic set diagram ROM 9a. The set relation list G5 contains displayed columns "A:", "B:", "C:", "D:", "A∩B:", "B∩C:", "A∩C:" to which the element counts of the sets corresponding to the respective circles c1–3 and the rectangle c4 are input.

The element count of each set is then input to the set relation list region G5, for example, as "A:5", "B:22", "C:7", "D:50" "A∩B:7", "B∩C:14" "A∩C:1", as shown in FIG. 18B. In response to this operation, the CPU 2 determines the maximum width value X and maximum height value Y of the set diagram display range G4 from the element count of the whole set B, for example, so that the maximum width and height values X and Y each are 7 whose product is substantially equal to 50 which is the element count of the whole set. In addition, a radius of a circle indicative of the set A is determined as substantially 3.8 so that an area of the circle indicative of the set A matches substantially 45 which is the element count of the set A. Similarly, the radii of circles indicative of sets B and C are determined so as to be 2.6 and 1.5, respectively.

Then, the CPU determines the central coordinates of the respective circles c1–c3 indicative of the sets A, B and C so that the areas of the common sets "A∩B:", "B∩C:", "A∩C:" involving the sets are 7, 3 and 1, respectively, and that the circles c1–c3 go in the rectangle c4. The circles c1–c3 indicative of the respective sets and the rectangle c4 are displayed with the thus determined radii and central coordinates of the circles, as shown in FIG. 18C.

As described above, in the second embodiment, the set diagram display control apparatus 1 executes the set diagram display process. When the elements of the respective sets and the count of those elements are input to the set relation list region G5, the CPU obtains the element counts of each of all relations involving the sets depending on the input elements or element counts of those sets, determines a display range of the set diagrams depending on the input or calculated element counts of the sets, determines the display positions and sizes of the circles c1–c3 and the rectangle c4 which constitute the set diagrams within the set diagrams display range G4, and displays the set diagrams with the determined display positions and sizes of the circles and rectangle.

As described above, since the CPU 2 determines the display range of the set diagrams depending on the element counts of the sets, the set diagrams are displayed in appropriate sizes within the set diagram display range G4 irrespective of whether or not the element counts of each set is small or not. Thus, the display of the set diagrams is easy to see. Even when set diagrams are displayed on a relatively small display screen of a function calculator having the CPU can deal elastically with the input element count of a set.

As described above, the display position and size or area of a circle in a set diagram are determined depending on the element count of the set concerned. Thus, when the area of the circle is changed, the area of the common set is always ensured depending on its element count, so that the relationship between the respective sets is correctly displayed, and can be understood as an image. Thus, the understanding of a person who learns the sets is improved.

[Third Embodiment]

Next, referring to FIGS. 19–25, a third embodiment of the set diagram display control apparatus will be described in which an element thereof similar to those of the first and second embodiments is identified by the same reference numeral as that used in the first and second embodiment.

In the third embodiment, the CPU 2 of the set diagram display control apparatus 1 executes a tracing process (FIG. 20) for identifying and displaying an area of a set specified by an expression of sets or instruction input by the input unit 3.

Figure 19:
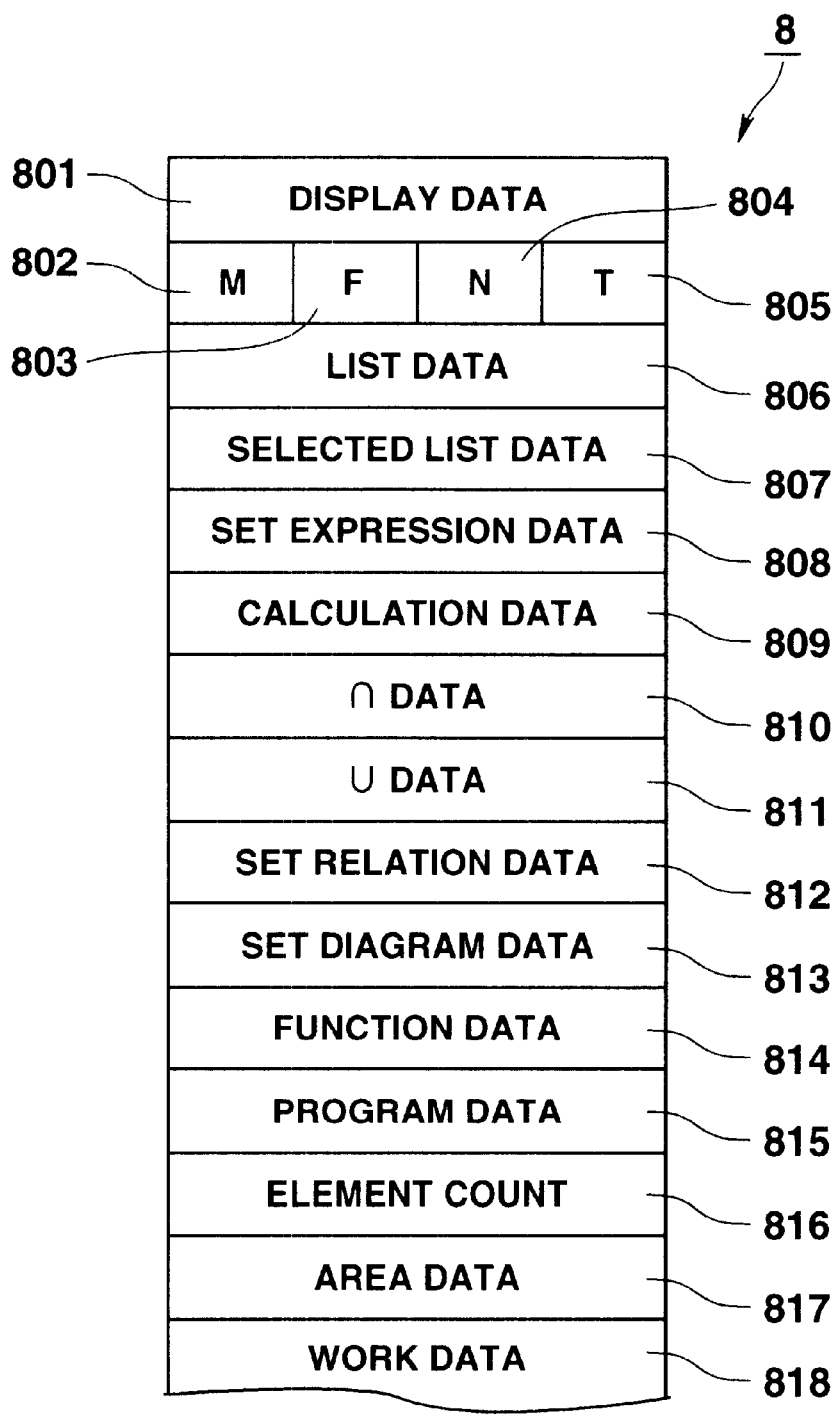
FIG. 19 is a view showing a constitution of a memory set in a RAM 8 of each of third and fourth embodiments.

FIG. 19 shows the composition of a RAM 8 of the apparatus 1 of the third embodiment. The RAM 8 includes an element count data memory 816 and an area data memory 817 in addition to the elements of the RAM 8 of the first embodiment.

The element count data memory 816 stores the element count of each of sets or the element count of a relation between the sets (common set, sum set, complementary set, subset, etc.) (FIG. 22B).

The area data memory 817 stores ranges of respective enclosed areas of set diagrams and their set relations in corresponding relationship (FIG. 22A).

When the CPU 2 displays a set diagram calculation input picture (FIG. 21) in the tracing process (FIG. 20), it temporarily stores in the area data memory 817 respective enclosed areas e1–e8 produced by circular diagrams c1–c3 and a rectangular diagram c4 of basic set diagrams and their relations in corresponding relationship. When the element count of each set is input to a set relation list G5, the CPU 2 distinctively displays an input column specified by the cursor key 3g of the input unit 3, reads an enclosed area corresponding to a set relation of the specified input column from the region data memory 817, and displays the enclosed area distinctively.

In addition, the CPU 2 executes a set diagram display process in the second embodiment to store the respective enclosed regions e1–e8 produced by circular diagrams c1–c3 and a rectangular diagram c4 indicative of the respective sets in correspondence to their set relations in the area data memory 817. When any set expression is input from the input unit 3, the CPU 2 fetches data on enclosed areas corresponding to the input set expression from the area data memory 817, and distinctively displays the fetched area in a color or display pattern different from those of other areas.

Operation of the set diagram display control apparatus of this embodiment will be described with reference to FIG. 20. The tracing process implies specifying with the cursor key 3d any one of the enclosed areas e1–e8 of the displayed set diagrams or any one of set expressions arranged in the set relation list G5.

Figure 21:
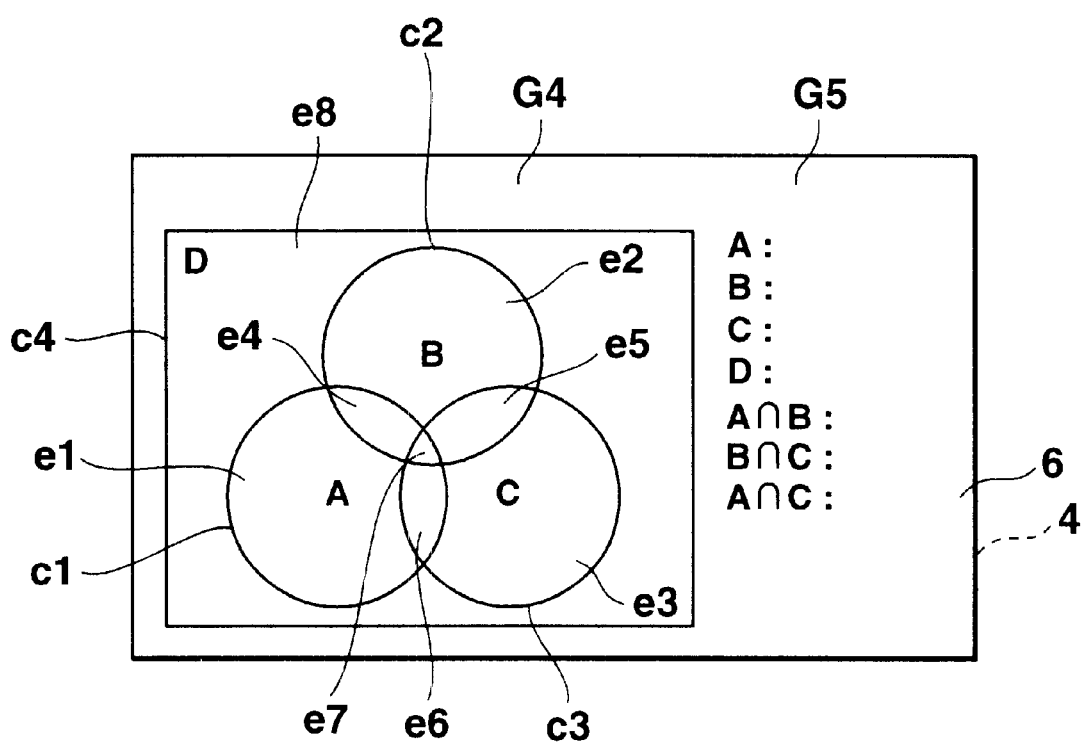
FIG. 21 shows enclosed areas formed by a rectangular diagram and circular diagrams constituting set diagrams in the tracing process.

When the user sets a set mode on a mode select picture G (FIG. 6A) and a set diagram calculation mode on a set process menu picture G1 (FIG. 6B), the CPU 2 reads a set diagram calculation input picture stored in the ROM 9, and displays it through a display driver 7 on the display unit 6 (step S701 of FIG. 21). The CPU 2 analyzes enclosed areas e1–e8 produced by the circular diagrams c1–c3 and rectangular diagram c4 of the displayed set diagrams, and stores the enclosed areas e1–e8 and their set relations in corresponding relation in the area data memory 817 (step S702).

Assume now that the set diagram calculation input picture of FIG. 21 indicates a relationship between, for example, three sets A, B and C and a whole set D. In this case, let the respective areas divided by arcs of the respective circular diagrams c1, c2 and c3 of the three sets A, B and C of the whole set D be e1–e8. The CPU 2 stores the ranges of the respective enclosed areas and their set relations for example, the area e1 and set relation A∩(B∪C) in corresponding relationship in the area data memory 817.

Then, the user operates the cursor key 3g to instruct the CPU 2 to change a color or display pattern of a specified input column of the set relation list G5. When the CPU 2 detects the operation of the cursor key 3g, (step S703), it changes the color or display pattern of the specified input column of the set relation list G5 (step S704 of FIG. 23A). The CPU then fetches from the area data memory 817 area data corresponding to a set relation in the input column specified by the cursor, changes the color or display pattern of the specified enclosed area, and displays it (step S705 of FIG. 23A).

When the element count of the appropriate set is input by the data input key 3a to the input column specified by the cursor key 3g (step S706), the CPU 2 stores the input element count and its set expression in corresponding relationship in the element count data memory 816. Then, the CPU 2 determines whether the "enter" key 3c has been operated (step S707). If not (step S708), the CPU 2 returns its control to step S703 to distinctively displays the input column specified by the cursor key 3g and the corresponding enclosed area. When the element count of the set is input by the data input key 3a, the CPU sequentially stores the input element count of the set in the element count data memory 816.

When thereafter the "enter" key 3c is operated (Yes in step S707), the CPU 2 calculates the element count of a respective one of relations each (common set, sum set, complement, etc.) between the input sets from their element counts, and stores the calculated element counts of the relations in the element count data memory 816 (step S708). Then, the CPU 2 fetches the element count of each of the relations stored in the element count data memory 816, and calculates the positions and sizes of the set diagrams from the fetched element counts of the relations (step S709). The steps of calculating the positions and sizes of the set diagrams are similar to those performed in the set diagram display process (FIG. 17) of the second embodiment. That is, the CPU 2 determines from the element count of a whole set a maximum width value X and a maximum height value Y of a rectangular diagram c4 indicative of the whole set, calculates the radii of the circular diagrams c1–c3 indicative of the respective sets from the numbers of elements of the respective sets, and calculates the central coordinates of the respective circular diagrams c1–c3 from the element count of the common set.

Then, the CPU 2 analyzes the ranges of the respective areas e1–e8 produced by the circular diagrams c1–c3 and the rectangular diagram c4 which are determined by the calculated central coordinates and radii of the circles, and then stores data on those analyzed ranges in the area data memory 817 (step S710), and updates the displayed set diagrams (step S711).

Figure 23A:
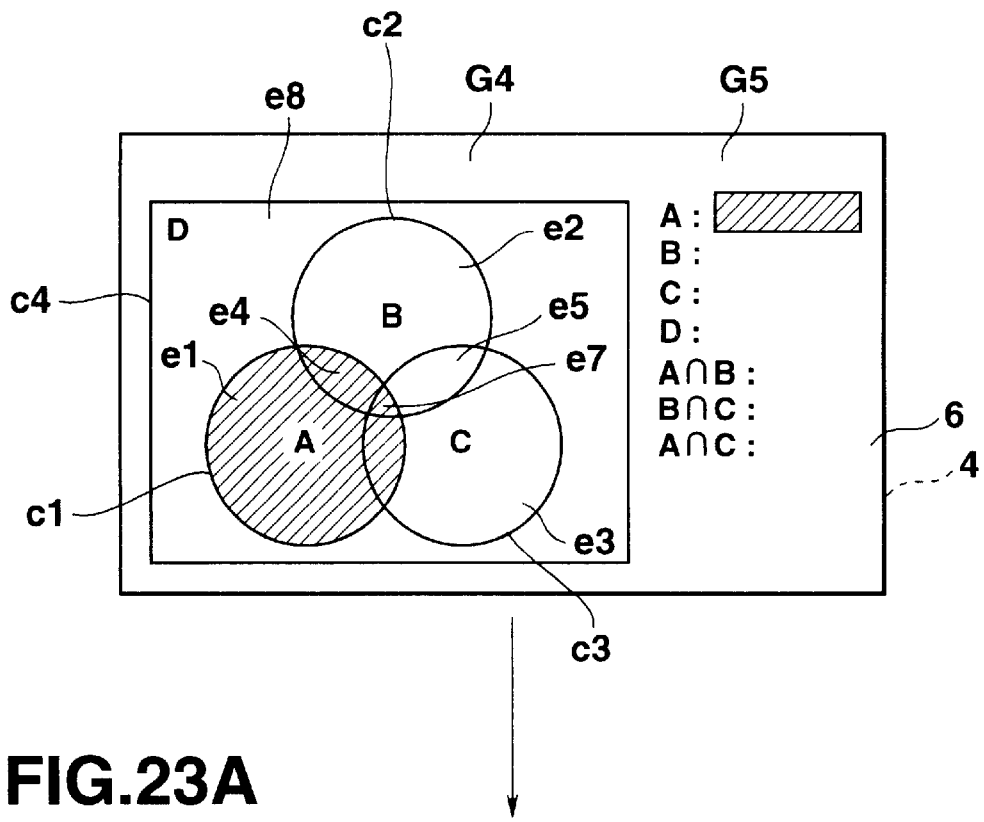
Figure 23B:
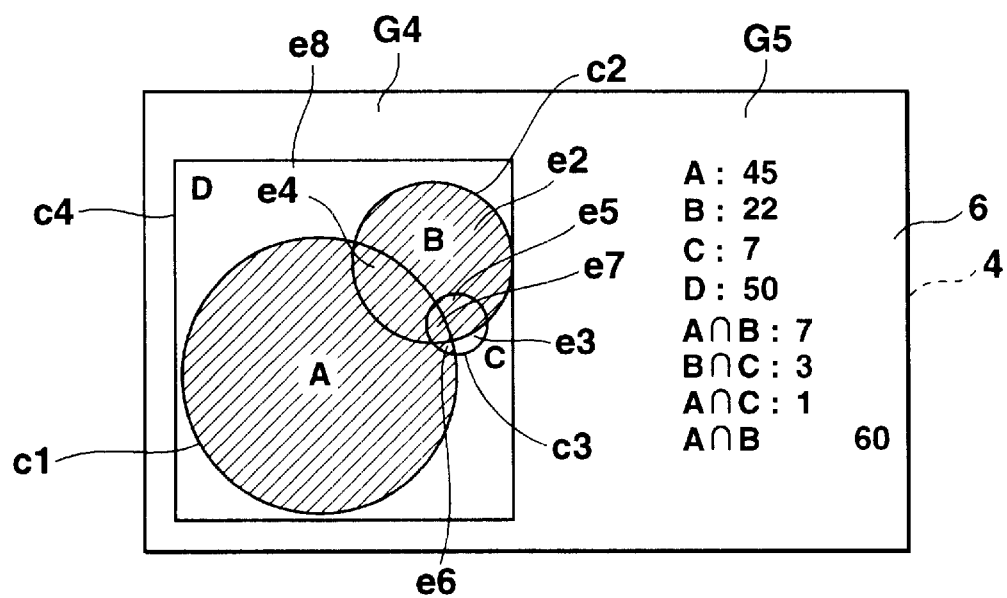

Thereafter, when any set expression is input by the data input key 3a to a set expression input column of the set relation list G5 (Yes in step S712), the CPU 2 reads from the area data memory 817 an enclosed area corresponding to the input set expression, and changes and displays a color or display pattern of a range of the read enclosed area (step S713 of FIG. 23B). Then, the CPU 2 reads the element count corresponding to the input set expression from the element count data memory 816, and displays it on the display unit 6 (step S714 of FIG. 23B).

When the cursor key 3g instructs the CPU 2 to vertically, horizontally, right or left move the cursor (step S715), the CPU 2 distinctively displays an enclosed area adjacent to that distinctly displayed in the set diagrams on the right, left, above or below the last-mentioned enclosed area (step S716)

For example, the enclosed area e1 is distinctively displayed as a reference in FIG. 21. If the CPU 2 is instructed to move the cursor rightward by the cursor key 3g, the CPU 2 displays an area e6 adjacent to the area e1 on the right side. When the CPU is again instructed to move the cursor rightward, it displays the area e3 adjacent to the area e6 on the right. When the CPU 2 is further instructed to move the cursor rightward when there is no more enclosed area adjacent to the area e3 on the right, the CPU again displays the leftmost area e1distinctively. When it is desired that a set A which occupies the four areas e1, e4, e6 and e7 should be specified, they may be specified simultaneously by operating the cursor key 3g and another predetermined key simultaneously.

When any desired enclosed area on the set diagrams is desired to be specified through the tablet 4, a point P on that desired area is specified with an input pen P. In this case, the CPU 2 fetches data on an enclosed area which contains the specified area from the area data memory 817, and distinctively displays the range of that area.

Thereafter, the CPU 2 reads a set expression indicative of the area of the set diagram specified by the cursor key 3g, etc., and the element counts of the set expression from the area data memory 817 and the element count data memory 816, and displays them on the display 6 (step S717).

Thereafter, the CPU 2 iterates the processing at steps S712–717 until an instruction of termination is input by the input unit 3, at which time (Yes at step S718), the CPU 2 terminates the tracing process.

FIG. 22A illustrates area data stored in the area data memory 817. FIG. 23A illustrates a set diagram calculation input picture.

Setting a set diagram calculation mode, the CPU 2 displays the set diagram calculation input picture. The CPU 2 then analyzes displayed ranges of the respective areas e1–e8 of the set diagrams displayed on the set diagram calculation picture, and as shown in FIG. 22A, stores in the area data memory 817 the enclosed areas shown by the set expression and their displayed ranges. When any particular one of input columns of the set relation list G5 is specified by the cursor key 3g, the CPU 2 distinctively displays the specified input column, and an enclosed area of a set diagram corresponding to the set indicated by the input column.

In the example of FIG. 23A, the input column of the set A of the set relation list G5 is specified by the cursor key 3g. In response to this operation, the CPU 2 refers to the area data memory 817 to recognize areas e1, e4, e6 and e7 corresponding to the circular diagram c1 indicative of the set A. The CPU 2 then displays the areas e1, e4, e6 and e7 in a color or display pattern different from other areas. In addition, when the CPU is instructed to move the cursor downward by the cursor key 3g on the set relation list, it displays the input column of a set B, fetches data on an enclosed area indicated by the set B from the area data memory 817, and distinctively displays the areas e2, e4, e5 and e7 corresponding to the circular diagram c2 indicative of the set B.

When the CPU 2 determines the radii and central coordinates of the respective circular diagrams c1, c2, c3 which indicate the sets A, B and C and the size of a rectangular diagram c4 indicative of the whole set D, depending on the element counts of the sets, the CPU 2 sequentially changes the respective enclosed areas and their ranges stored in the data area memory 817 of FIG. 22A in accordance with data on the determined circular diagrams c1–c3 and the rectangular diagram c4, and stores data on the changes enclosed areas and ranges.

FIG. 22B illustrates data on the element counts of the sets stored in the element count data memory 816. More particularly FIG. 23B illustrates set diagrams of circular diagrams c1–c3 and a rectangular diagram c4 changed in position and size in accordance with the input element counts of the respective sets. When the element counts of the sets are input from the input unit 3, the CPU 2 stores them in correspondence to their set expression, as shown in FIG. 22B. In addition, when a set expression "A∪B" is to the set expression input column of the set relation list G5 of FIG. 23B with the data input key 3a, the CPU 2 reads from the area data memory 817 data on the areas e1, e2, and e4–e7 stored in correspondence to the set expression "A∪B", displays a color or display pattern of those areas, reads the element counts of the sets corresponding to the set expression "A∪B" from the data memory 816, and displays the read element count as "60".

When any one of the enclosed areas of the set diagrams is specified by the cursor key 3g or with an input pen P on the tablet, the specified enclosed area is distinctively displayed. In FIG. 23B, the enclosed areas e1, e2, e4–e7 are specified simultaneously. The CPU 2 reads a set expression "A∪B" involving the specified enclosed areas from the area data memory 817 and displays it, reads the element count "60" from the element count data memory 816, and displays it.

When in the third embodiment a set list in which the elements of each set are input to that set is set, the CPU 2 distinctively displays calculations of the element count of each of the set relations and the enclosed areas of the set diagram corresponding to the input set expression, the elements and element count of the input set expression.

Figure 24:
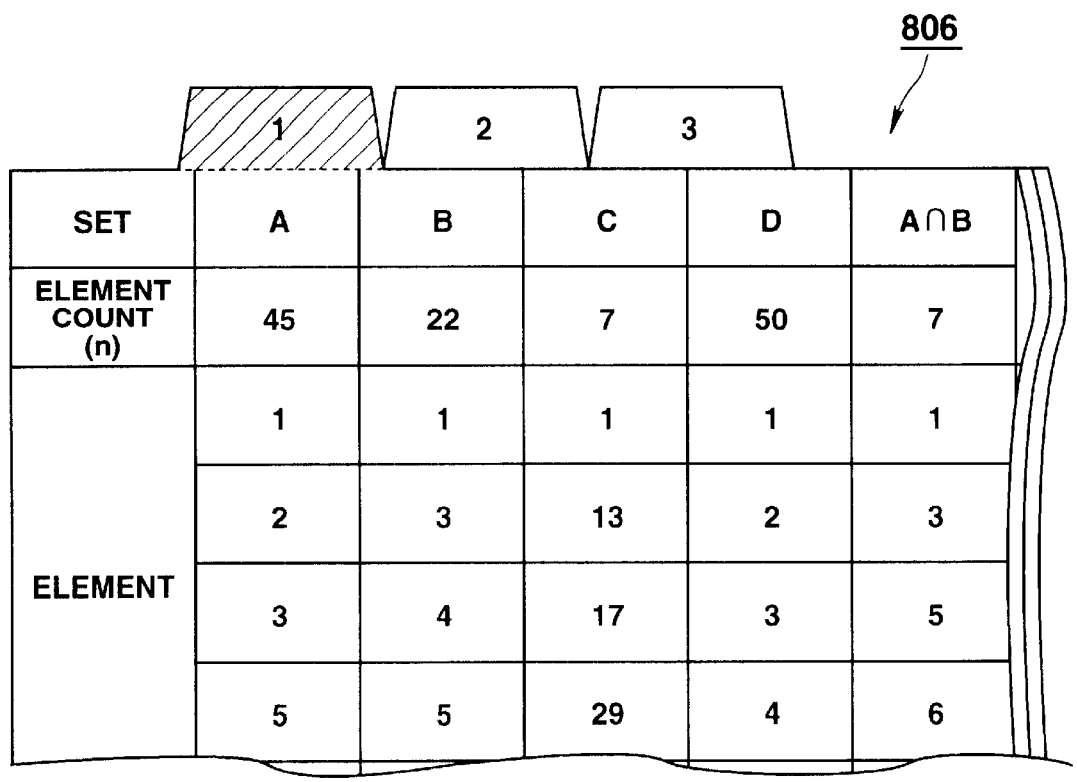
FIG. 24 shows an example of information regarding sets input to a set list stored in a list data memory 806 in the tracing process where the set list is set.

For example, when the elements of each of the sets A, B and C are input to a set list (sheet No. "1") selected and set, as shown in FIG. 24, on the displayed list input picture in the set calculation process (FIG. 7) of the first embodiment, the CPU 2 calculates the element count of each set, and stores it along with the elements of that set as a corresponding list data in the list data memory 806 of the RAM 8. The CPU 2 then calculates the elements and the element count of each of common sets (A∩B, B∩C, A∩C, A∩B∩C, etc.) and the elements and the element count of each of sum sets (A∪B, B∪C, A∪C, A∪B∪C, etc.), and stores them in a ∩ data memory 810 and a ∪ data memory 811, respectively.

Figure 25A:
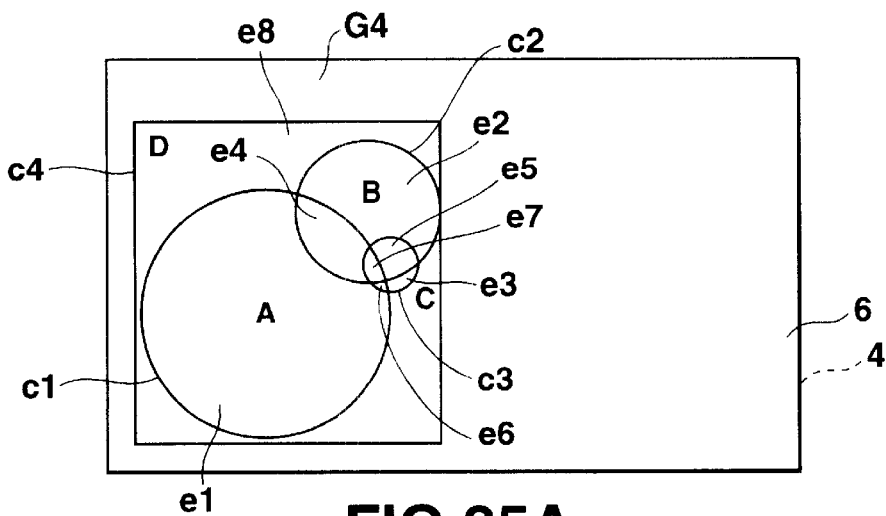

FIG. 24 illustrates the elements and element count of each of the sets and input to a set or placed set list (sheet number "1"), and the elements and element counts of each of the common and sum sets additionally stored. The CPU 2 determines the radii and central coordinates of circles indicative of the sets A, B and C based on the element counts of the sets and the element counts of the common sets, and stores in the area data memory 817 the ranges of the enclosed areas e1–e8 produced by the arcs of the respective circles. FIG. 25A illustrates set diagrams each having a position and size determined by the CPU 2 based on the element counts of the sets. As shown, the respective areas e1–e8 of the set diagram sectioned by the sets A, B and C are stored in correspondence to the respective set expressions indicative of relations each between the sets in the area data memory 817 (FIG. 22A).

In addition, when any set expression is input to the set expression input column, the CPU 2 reads from the area data memory 817 data on an enclosed area corresponding to the input set expression, displays it distinctively, reads elements and element count of the input set expression stored in the list data memory 806, ∩ data memory 810, and ∪ data memory 811, and displays the read elements and element count of that set expression.

Figure 25B:
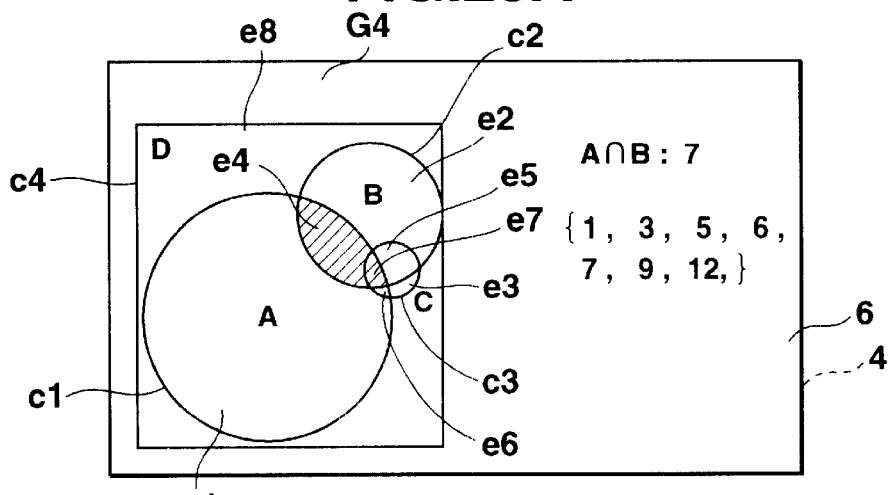

FIG. 25B illustrates a set expression "A∩B" input to the set relation list G5 in a state where a set diagram including a combination of circular diagrams c1, c2, and c3 indicative of the sets A, B and C, respectively and a rectangular diagram c4 indicative of the whole set D is displayed. In response to the set expression "A∩B" being input, the CPU 2 reads from the area data memory 817 "e4, e7" as enclosed areas corresponding to "A∩B", distinctively displays those enclosed areas, fetches elements "{1, 3, 5, 6, 7, 9, 12}" and element count "7" of the set expression stored in the list data memory 816, and then displays those data.

Figure 25C:
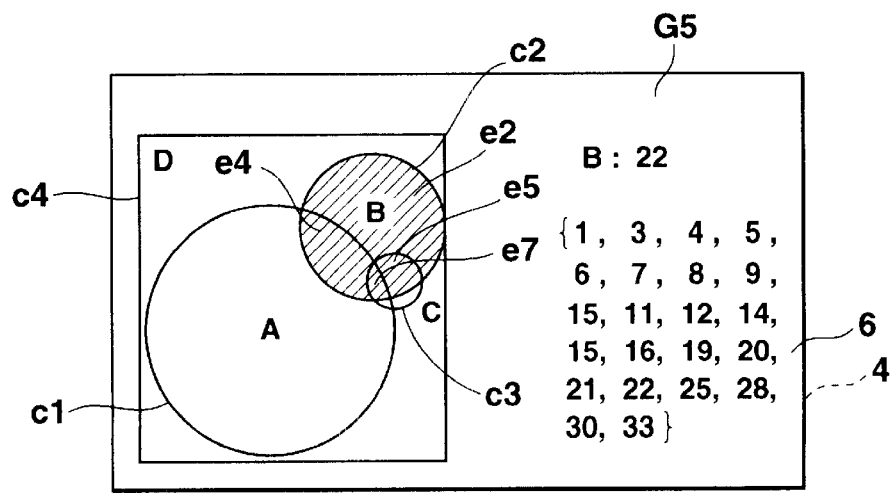

As further shown in FIG. 25C, when "B" is input as a set expression, the CPU 2 similarly reads from the area data memory 819 the enclosed areas "e2, e4, e5 and e7" corresponding to the set expression B, and distinctively displays those areas, fetches and displays elements {1, 3, 4, 5, 6, 7, 8, 9, 10, 11, 12, 14, 15, 16, 19, 20, 21, 22, 25, 28, 30, 33} and element count "22" corresponding to the set expression "B" stored in the list data memory 806.

As described above, when the element count of each set is input to the set relation list G5 in the third embodiment, the CPU 2 distinctively displays the input column specified by the cursor key 3g and reads from the area data memory 817 enclosed areas corresponding to the specified set relation in the input column, and distinctively displays those enclosed areas. The CPU 2 then further stores in the area data memory 817 the enclosed areas, produced by rectangular and circular diagrams which compose a set diagram, in correspondence to the set relation. When any set expression is then input by the input unit 3, the CPU 2 fetches an enclosed area corresponding to the set expression from the area data memory 817, displays this enclosed area in a color or display pattern different from others, and reads and displays from the data memory 816 the elements and element count of the enclosed area corresponding to that set expression.

Thus, by distinctively displaying the specified enclosed areas, the user can visually easily identify the enclosed area to which the set expression is input. When a set expression is input, the CPU 2 distinctively displays the enclosed areas corresponding to the set expression, and information on the elements and element count of each of the enclosed areas. Thus, the user can easily understand the relationship between the set expression and the set diagram.

[Fourth Embodiment]

Referring to FIGS. 26–27A, 27B, 27C, 28, 29A, 29B, 29C, 30A, 30B, 31A, and 31B, a fourth embodiment of the set diagram display control apparatus will be described next. In the fourth embodiment, an element similar to that of each of the first-third embodiments is identified by the same reference numeral as that used to identify that element.

Figure 28:
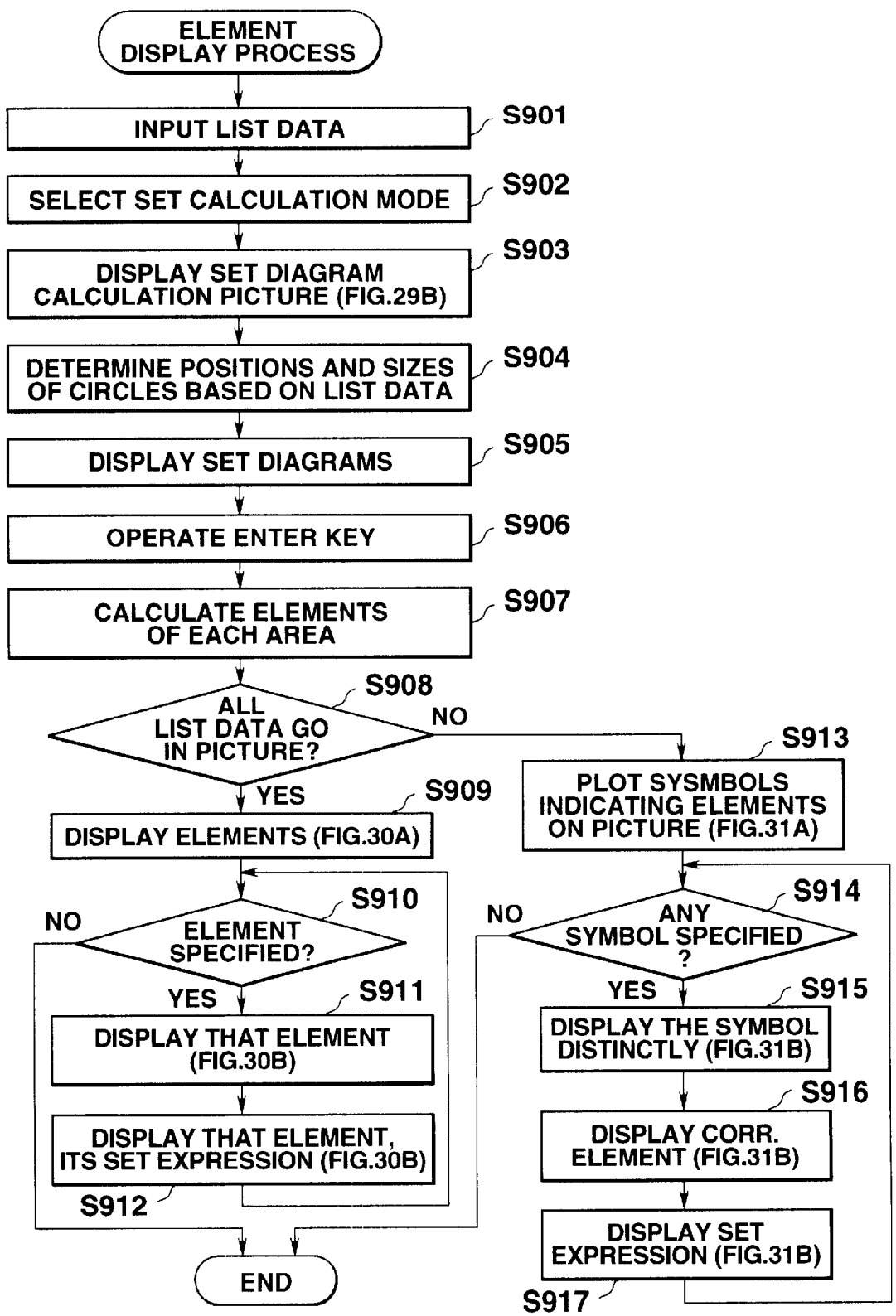
FIG. 28 is a flow chart of an element display process executed by the set diagram display control apparatus 1.

In the fourth embodiment, the CPU 2 of the set diagram display control apparatus 1 executes an element count display process in which the CPU 2 calculates the element count belonging to each of enclosed areas of a set diagram displayed on the display unit 6 and displays the calculated element count in that area (FIG. 26), and an area display process in which the CPU displays the elements belonging to each of the enclosed areas of the displayed set diagram in that area (FIGS. 28 A–C).

Figure 26:
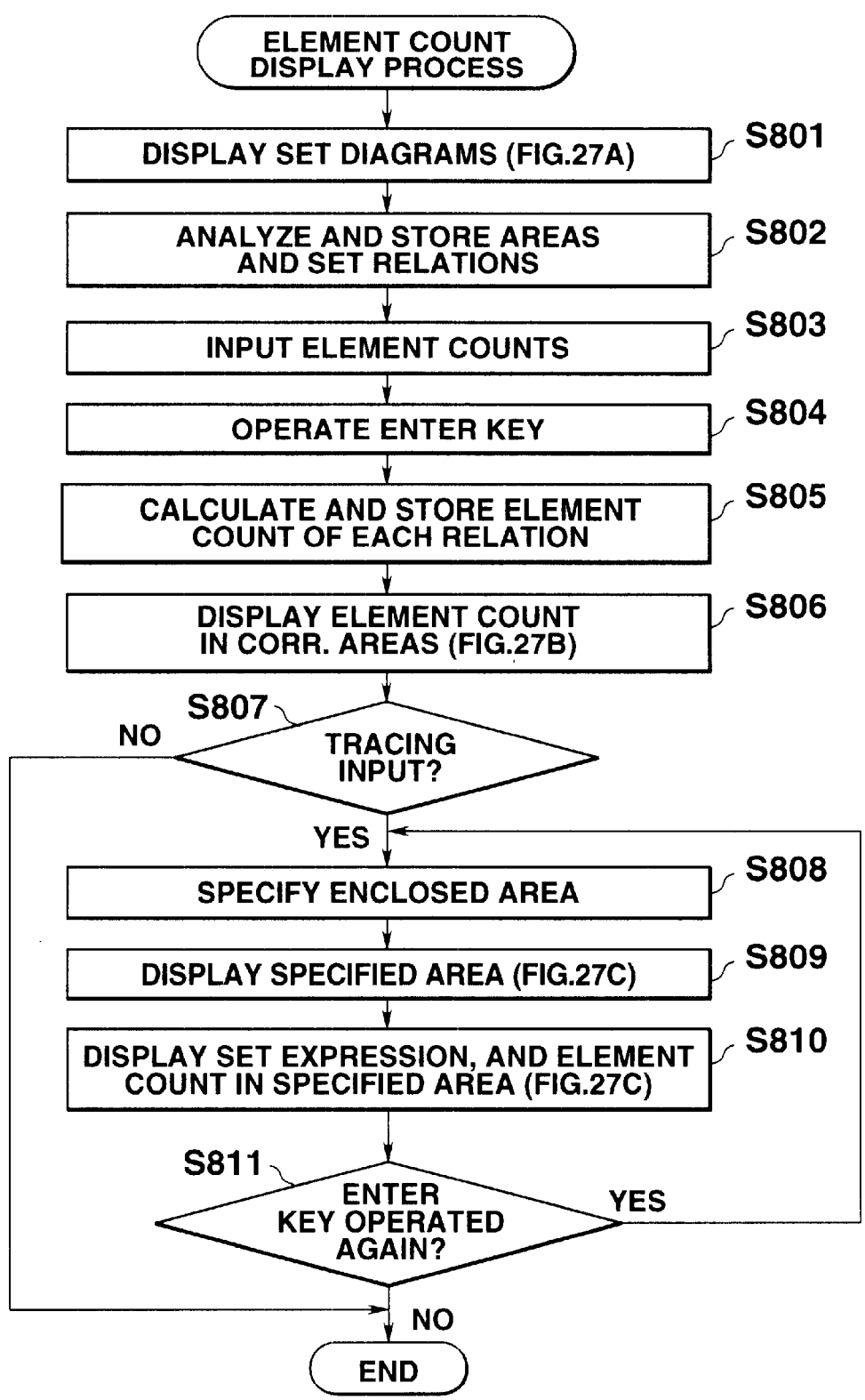
Figure 27A:
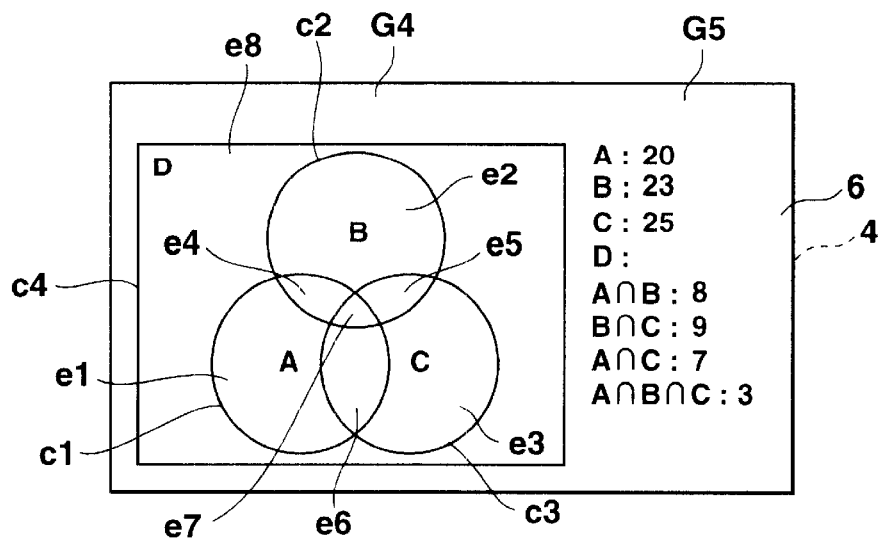
FIG. 27A shows inputs to the set relation list G5.

When the CPU 2 displays a set diagram calculation input picture (FIGS. 22A and B) in the element count display process (FIG. 26), the CPU 2 temporarily stores the enclosed areas produced by circular and rectangular diagrams of a basic set diagram in correspondence to set relations in an area data list of a RAM 8, and stores in the element count data memory 816 data on the element counts of each of sets input from the input unit 3. Further, the CPU 2 displays the element count corresponding to a set relation indicated by each of enclosed areas of each set. When any one of enclosed areas of the set diagram is specified by the cursor key 3g for tracing purposes, the CPU 2 distinctively displays the specified enclosed area, and displays a set expression and its element count of a set indicated by the enclosed area (FIG. 27C).

By executing a set diagram display process such as is shown in the second embodiment, a radius and central coordinates of a circle which indicates each set may be changed depending on the element count of the set.

Figure 30A:
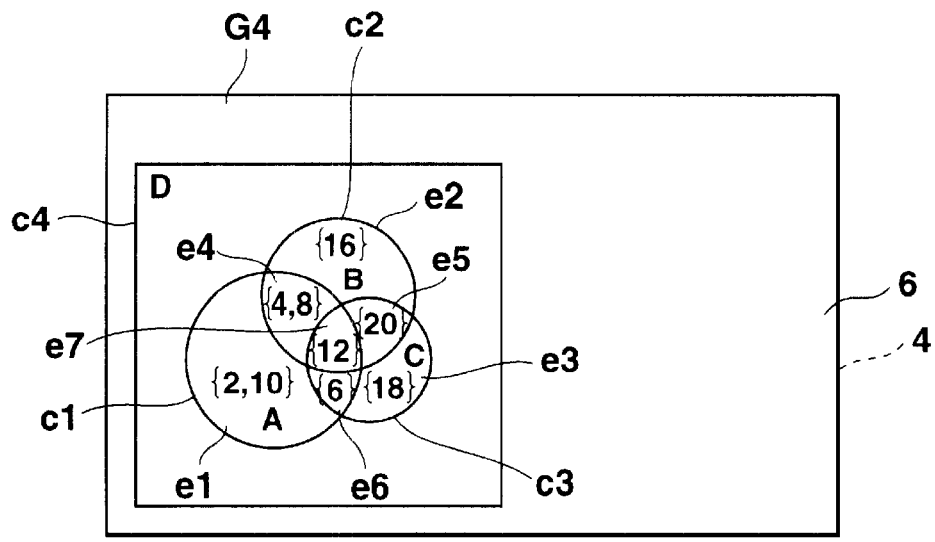

In the element display process (FIG. 28), the CPU 2 calculates the element count of each of the enclosed areas of the set diagram in accordance with information on the elements and element counts input to the selected and placed set list, changes and displays the position and size of a circle which indicates each set, displays the calculated element count in a corresponding enclosed area, and displays the elements stored in the list data memory 806 in a corresponding enclosed area (FIGS. 30A and B). When all the elements cannot be displayed within each of the enclosed areas, the CPU displays the elements with a symbol such as "×", "□" or "·".

Figure 31A:
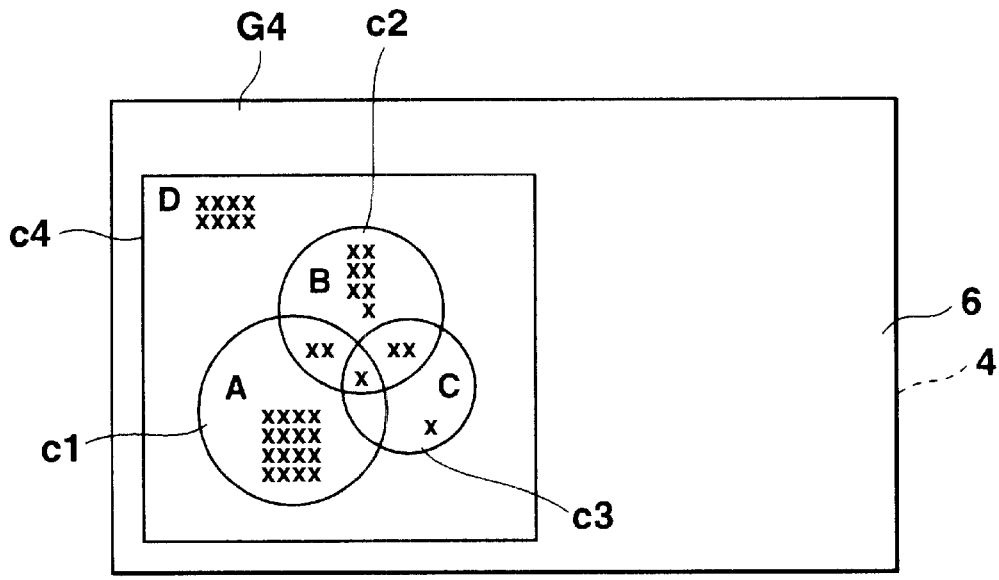
FIGS. 31A and 31B each show an example of the elements displayed as symbols in each of enclosed areas of set diagrams, an example of a set expression to which a specified symbol belongs, and the element shown by the symbol in the element display process.

In addition, when an element displayed in the set diagram is specified by the cursor key 3g, the CPU 2 distinctly displays this element and a set to which the specified element belongs. When the elements are displayed by such symbol, the CPU 2 displays the element indicated by the symbol specified by the cursor key 3g in the tracing process (FIGS. 31A and B).

Operation of the set diagram display control apparatus will be described. FIG. 26 is a flow chart of the element count display process performed by the apparatus. FIGS. 27A, B and C illustrate a set diagram, set expression, its solution, etc., displayed in the element count display process.

When a set mode is set in a whole process of FIG. 4, and a set diagram calculation mode is selected/set in a set mode process of FIG. 5, the CPU 2 reads the set diagram calculation input picture stored in the ROM 9, and displays it via the display driver 7 on the display unit 6 (step S801 of FIG. 27 A). The CPU 2 then analyzes respective enclosed areas e1–e8 of a set diagram composed of circular diagrams c1, c2 and c3 indicative of sets A, B and C, respectively, and a rectangular diagram c4 indicative of a whole set D, and stores the enclosed areas e1–e8 and the set relations in corresponding relationship in the area data memory 817 of the RAM 8 (step S802).

When the element count of each of the sets is input by the data input key 3a to the set relation list G5 (step S803), the CPU 2 stores the input element counts and an expression indicative of the set relation in corresponding relationship in the element count data memory 816 of the RAM 8. Thereafter, when the CPU 2 detects operation of the "enter" key 3c (step S804), it calculates the element counts of all set relations (common set, sum set, complementary set, etc.) from the input element counts, and additionally stores these calculated element counts in the element count data memory 816 (step S805).

Figure 27B:
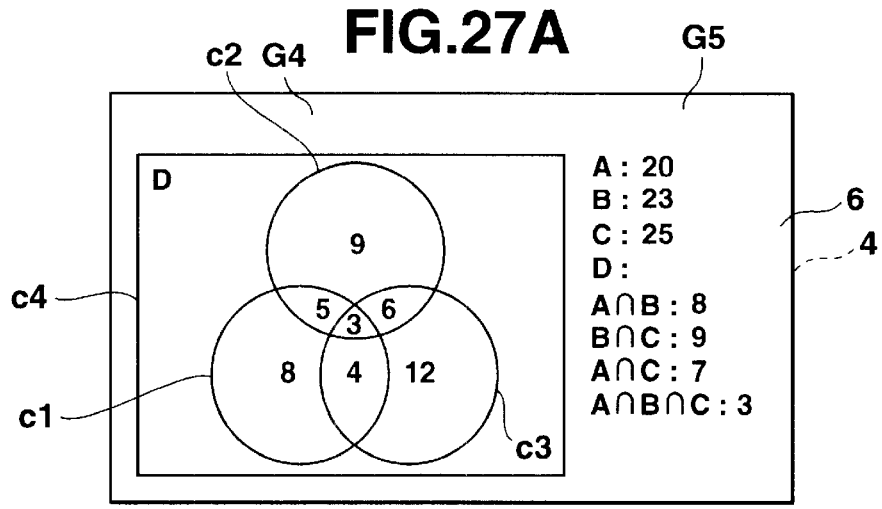
FIG. 27B shows element counts displayed in the enclosed area of the set diagrams and FIG. 27C shows set expressions and their element counts corresponding to a specified enclosed region.
Figure 27C:
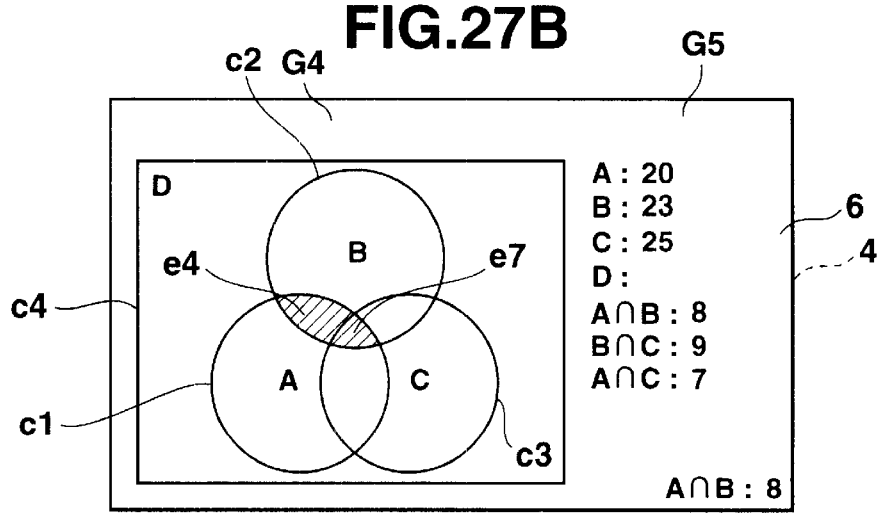

The CPU 2 then fetches data on the elements of each of the enclosed areas e1–e8 stored in the element count data memory 816, the displayed ranges of the areas stored in the area data memory 817, and displays the element counts in the corresponding areas e1–e8 of the set diagram (FIG. 27B).

When an instruction to trace a set diagram is input by the cursor key 3g (Yes at step S807), the CPU 2 executes a process similar to the tracing process performed in the third embodiment. That is, when any one of the enclosed areas e1–e8 of the set diagram is specified by the cursor key 3g (step S808), the CPU 2 displays the specified enclosed area distinctively (step S809), and additionally displays a set expression and the element count of the specified enclosed area in the set relation list G5 (step S810 of FIG. 27C).

Thereafter, when the "enter" key 3c is again operated (step S811; Yes), the CPU 2 iterates the tracing process (steps S807–S810). If the "enter" key 3c is not operated (No in step S811), the CPU 2 terminates the element count display process.

FIG. 27A illustrates the element count of each set input in a set diagram calculation input picture displayed in the element count display process. FIG. 27B illustrates the element count of each of the enclosed areas of the set diagrams displayed in that enclosed area in the element count display process. FIG. 27C illustrates an enclosed area which the CPU 2 is instructed to trace, and a set expression corresponding to that enclosed area and its element count.

As shown in FIG. 27A, when the numbers of elements are input as "A:20", "B:23", "C:25", "A∩B:8", "B∩C:9", "A∩C:7", "A∩B∩C:3" to the input column of the set diagrams composed of circuit diagrams c1–c3 and a rectangular diagram c4 and a set relation list G5 read out from the ROM 9 in the set diagram calculation input picture, the CPU 2 stores them in the element count data memory 816, and further calculates the respective element counts of the enclosed areas from the input element. For example, since the element count of the area e1 is n(A)–n(A∩B)–n(A∩C)+n(A∩B∩C), it is calculated as 8.

The CPU 2 then displays the element count of each of the enclosed areas of the set diagrams in that area, as shown in FIG. 27B.

When any ones of the enclosed areas of the set diagrams, for example, the areas e4 and e7, are simultaneously specified by a "trace" instruction, the CPU 2 distinctively displays the specified enclosed areas, as shown in FIG. 27C. The CPU 2 further reads a set relation "A∩B" corresponding to the areas e4 and e7 from the area data memory 817, reads from the element count data memory 816 the element counts "5" and "3" corresponding to the areas e4 and e7, and calculates the sum of the read element counts as "8", and then displays the sum "8" along with the related set expression.

The element display process executed by the fourth embodiment of the set diagram display control apparatus will be described in detail with a flow chart of FIG. 28.

When the elements of each of the sets A, B and C are input to the set list (with a sheet No. 1) selected and set after the list date has been input in the set calculation process (FIG. 7) of the first embodiment, the CPU 2 obtains the element count of each of the sets, and stores the elements set and element count of each set as list data in the list data memory 806. In addition, the CPU 2 calculates the elements and element count of each of common sets (A∩B, B∩C, A∩C, A∩B∩C, etc.) and the sum sets (A∪B, B∪C, A∪C, A∪B∪C, etc.) and additionally stores those data in the ∩ data memory 810, and ∪ data memory 811 (step S901).

Thereafter, when the set calculation mode is selected and set (step S902) the CPU 2 reads the set diagram calculation input picture from the ROM 9 and then displays it on the display unit 6 (step S903 of FIG. 29). Then, the CPU 2 determines the radius and central coordinates of each of circular diagrams c1, c2 and c3 which indicate the sets A, B and C based on the element counts of the sets and their common sets in the list data (step S904), stores data on the respective ranges of the areas e1–e8 in the area data memory 817, and displays the set diagrams on the display unit 6 (step S905).

Figures 29A, 29B, 29C:
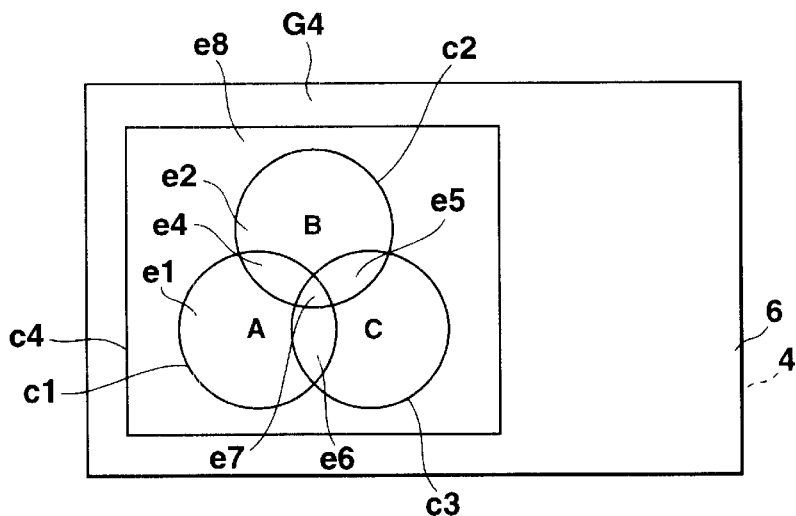

Then, when an instruction of calculation execution is input by the "enter" key 3c (step S906), the CPU 2 calculates the elements of each of the enclosed areas step S907. Assume, for example, that as shown in FIG. 29A, the elements {2, 4, 6, 8, 10, 12}, {4, 8, 12, 16, 20}, and {6, 12, 18, 20} are input for as the three sets A, B and C, respectively, to the list. The CPU 2 then calculates, in response to the instruction, elements which satisfy the respective set relations represented by the enclosed areas based on the elements input to the list. As shown in FIG. 29B, when the set diagrams are divided into enclosed areas e1–e7 by a rectangular diagram c4, and circular diagrams C1–C3 areas e1–e7, the set relations in the respective areas e1–e7 are represented by the set expressions shown in FIG. 29C. For example, the area e1 in this case is represented by a set expression A∩$\overline{(B∪C)}$.

Thus, the CPU 2 extracts elements {2, 10} which satisfy the set expression from the elements of each of the input sets. Similarly, other the CPU 2 calculates the elements of the respective enclosed areas.

The CPU 2 then refers to the displayed range of each of the enclosed areas stored in the area data memory 817, and determines whether all the obtained elements can be displayed so as to go in the respective enclosed areas (step S908).

If so (Yes at step S908), the CPU 2 then displays the obtained elements in the respective enclosed areas (step S909 of FIG. 30A).

Thereafter, when any one of the displayed elements is specified by the cursor key 3g (Yes in step S910), the CPU 2 distinctively displays the specified element (step S911 of FIG. 30B), further displays a set relation for the specified element and a numerical value of the element (step S912). In other words, when the CPU 2 recognizes an enclosed area in which the specified element is contained, it refers to the area data memory 817 to display the set expression which indicates a set relation between the sets in the area, and displays the specified element.

When the CPU 2 determines that all the elements do not go in the respective enclosed areas (No in step S908), the CPU 2 then plots all the elements with in symbols, for example "×", in the respective displayed enclosed areas (step S913 of FIG. 31A).

Thereafter, when any of the displayed symbol is specified by the cursor key 3g (Yes in step S914), the CPU 2 distinctively displays the specified symbol (step S915 of FIG. 31B), and further displays a set relation involving the element represented by the specified symbol and the numerical value of the element (steps S916, S917). In other words, when the CPU 2 recognizes an area where the specified symbol is contained, it recognize a corresponding element, and refers to the area data memory 817, to display a set expression indicative of the area relation, and also the element corresponding to the specified symbol.

Thereafter, when an element or its symbol is specified by the cursor key 3g (Yes in each of steps S910, S914), the CPU 2 then iterates the processing in steps S711, S712, S715–S717). If no element or its symbol is specified by the cursor key 3g (No in each of steps S910, S914), it terminates the element display process.

FIGS. 30 and 31 illustrate an element display process. For example, if elements are input to sets A, B and C in the list as shown in FIG. 29A; that is {2, 4, 6, 8, 10, 12}, {4, 8, 12, 16, 20}, and {6, 12, 18, 20} are input as the sets A, B and C, respectively, the CPU 2 determines the positions and sizes of circular diagrams c1, c2 and c3 of the sets A, B and C and a rectangular diagram c4, depending on the element counts of the respective enclosed areas, and then displays them on the display unit 6. The CPU 2 then determines the elements corresponding to the respective enclosed areas of the set diagrams composed of the diagrams c1–c4 by analyzing the set relations concerned. Then, the CPU 2 determines whether all the elements can be displayed so as to go in the respective enclosed areas. If so, as shown in FIG. 30A, the CPU 2 displays the elements in the respective enclosed areas in numerical value. For example, the elements {2, 10}, {16}, {18}, {4, 8}, {20}, {6}, and {12} are displayed in the areas e1, e2, e3, e4, e5, e6 and e7, respectively.

Figure 30B:
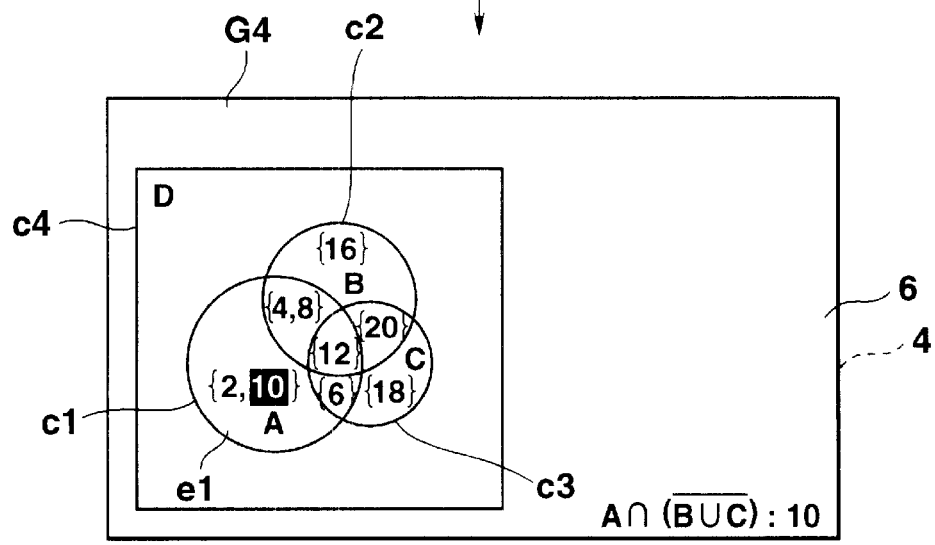

In addition, when any one of the elements of the set diagrams, for example an element "10" of the area e1, is specified by the cursor key 3g, the CPU 2 changes a color or display pattern of the specified element "10", as shown in FIG. 30B, and displays the numerical value of that element along with a set expression A∩(B∪C) indicative of a set relation for the enclosed area e1.

When many elements of the sets are input and all of them cannot be all displayed in the respective areas, the CPU 2 plots the elements of each enclosed area with symbols "×", as shown in FIG. 31A.

Figure 31B:
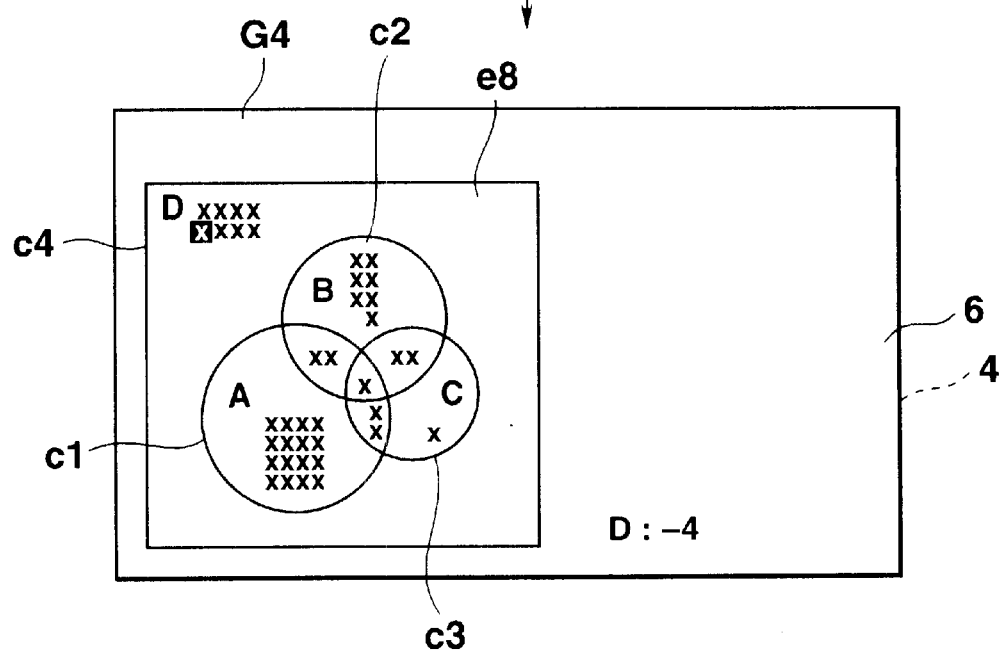

In addition, when any element or any symbol, for example, in the area e8, of the set diagrams is specified by the cursor key 3g, the CPU 2 changes the color or display pattern of the specified symbol, and displays "D" as a set expression indicative of a set relation to which the symbol belongs, along with a numerical value "–4" of the element, as shown in FIG. 31B.

As described above, in the fourth embodiment, the CPU 2 temporarily stores in the area data list of the RAM 8 the enclosed areas produced by the rectangular diagram c4 and circular diagrams c1–c3 which compose the set diagrams in correspondence to their set relations, and stores element counts of each of the sets input from the input unit 3 in the element count data memory 816. In addition, the CPU 2 displays the element counts corresponding to each of the set relations indicated by the enclosed areas of the sets. In addition, when any one of the enclosed areas of the set diagrams is specified by the cursor key 3g, the CPU 2 distinctively displays the specified enclosed area, a set expression indicated by the enclosed area, and its element count.

The CPU 2 calculates the respective element counts of the enclosed areas of the set diagrams based on the list data input to the selected set list, displays the calculated element counts in corresponding area, and the elements stored in the list data memory 806 in the corresponding enclosed areas. When all of element counts cannot be displayed in the corresponding enclosed areas, the CPU displays those elements with any one of symbols "×", "□", ".", etc.

When one of the elements or symbols displayed in the set diagrams is specified, the CPU distinctively displays it and the set to which the specified element or symbol belongs.

Thus, information on the set is displayed in each of the enclosed areas. When any one of elements or element counts displayed in a particular one of the enclosed areas of the set diagrams is specified, a set expression indicative of a set relation for the particular enclosed area is displayed. Thus, the user can instantaneously understand the relation between the enclosed area, its elements and element counts.

When there are many elements to be displayed in the respective enclosed areas, the CPU displays those elements as symbols. By specifying any one of the symbols, the user can obtain detailed information on that element.

Figure 20:
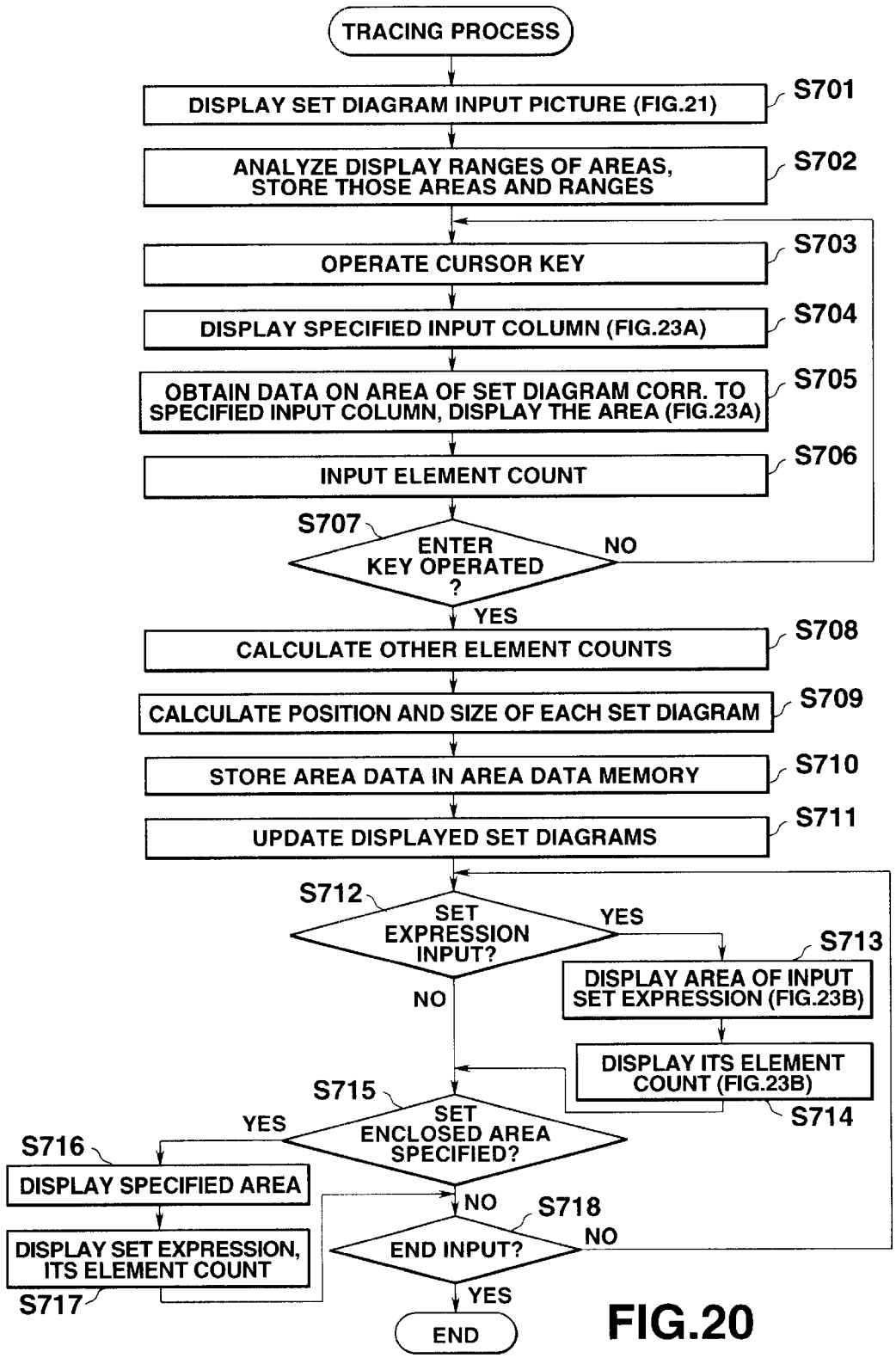
FIG. 20 is a flow chart of a tracing process executed by the set display control apparatus.

The processes described with respect to the first-fourth embodiments, that is, the set calculation process and common steps to the set calculation process illustrated in the FIG. 7 flow chart, the set calculation process illustrated in the FIG. 9 flow chart, the set diagram calculation process illustrated in the FIG. 13 flow chart, the set diagram display process illustrated in the FIG. 17 flow chart, the tracing process illustrated in the FIG. 20 flowchart, the element count display process illustrated in the FIG. 26 flow chart, and the element display process illustrated in the FIG. 28 flow chart, may be stored as computer executable programs in a memory card (ROM, RAM card or the like), a magnetic disk (floppy, hard disk or the like), an optical disk (CD-ROM, DVD or the like), or a semiconductor memory or the like. The computer may read any one of the programs into the storage device 10 and control its own operation to realize the set calculation function, set diagram calculation function, set diagram display function, tracing function, element count display function, and element display function described in the first-fourth embodiments to thereby execute the respective corresponding processes as mentioned above.

SUMMARY

As described above, according to the present invention, there is provided a diagram display control apparatus comprising:

display means (6 of FIG. 1);

input means for inputting data on a set (3, 4 of FIG. 1); and set diagram display control means for controlling on the display means a display of a set diagram based on the data on a set input by said input means in accordance with the input data on a set so that the set diagram goes in a set diagram display range of the display means (2 of FIG. 1; S605, S606, S513 of FIG. 17; FIG. 18C).

According to the inventive set diagram display control apparatus, when data on a set is input, the set diagram display control means controls the display of a set diagram based on the input data on a set in accordance with the input data on a set so that the set diagram goes in a set diagram display range of the display means.

Thus, the size of the set diagram is determined depending on information on the input set, and the set diagram is displayed in that size within the displayed range. Thus, the set diagrams are always displayed manifestly irrespective of whether the element counts of the respective sets are large or not. Even when a set diagram is displayed, for example, on a function calculator having a relatively small display screen, it is displayed flexibly in accordance with information on a set such as for example, the input element count.

According to the present invention, there is provided a set diagram display control apparatus comprising:

display means (6 of FIG. 1);

input means for inputting data on sets (3, 4 of FIG. 1);

calculating means for calculating a display position and size of each of subdiagrams which constitute a set diagram indicative of the sets, in accordance with the data on sets input by the input means (2 of FIG. 1; S607–S612 of FIG. 17); and set diagram display control means for displaying on said display means the subdiagrams in the respective display positions and sizes calculated by the calculating means (2 of FIG. 1; S613 of FIG. 17; FIG. 18C).

According to the inventive set diagram display control apparatus, calculating means calculates a display position and size of each of subdiagrams which constitute a set diagram indicative of the sets, in accordance with the data on sets input by the input means. The set diagram display control means displays on the display means the subdiagrams in the respective calculated display positions and sizes.

Thus, the display positions and sizes of the diagrams which constitute the set diagrams are determined in accordance with the input information on the sets and displayed, so that the element count of each set can match the size of the diagram indicative of that set. For example, it is ensured that the size of a common set to a plurality of sets matches the element count of the common set, so that each set relation can be displayed correctly. As a result, the user can correctly understand the relation instantaneously and visually, so that the user can understand the set better.

According to the present invention, there is provided a set diagram display control apparatus comprising:

display means for displaying a set diagram (6 of FIG. 1);

area specifying means for specifying any one of areas of the set diagram displayed on said display means (3, 4 of FIG. 1; S703 of FIG. 20); and control means for distinctively displaying on said display means the area specified by said area specifying means (2 of FIG. 1; S713, S716 of FIG. 20; FIGS. 23A, B).

According to the inventive set diagram display control apparatus, when the area specifying means specifies any one of areas of the set diagram displayed on the display means, the control means distinctively displays the specified area.

Thus, the specified area is displayed distinctively, so that the user can easily and visually recognize the area where the appropriate process is being performed now. Thus, the user can input, for example, an element count of a set while confirming that area visually, and can operate the set diagram display control apparatus correctly and easily.

In this set diagram display control apparatus, control means may be further provided for displaying on the display means data on the area specified by the area specifying means (2 of FIG. 1; S714, S717 of FIG. 20; FIG. 23B).

According to the inventive set diagram display control apparatus, the specified area is distinctively displayed, while information on the relation between the sets concerned, the element count, and the elements in the specified area can be displayed so that the set diagrams can easily be analyzed in an easy operating manner.

In this set diagram display control apparatus, the set area specifying means may specify any area of the set diagram by inputting a set expression.

According to the inventive set diagram display control apparatus, when the set expression is input, an area corresponding to the set expression is distinctively displayed, and information on the element count for the area is displayed. Thus, the relation between the set expression and the set diagram is easily understood.

According to the present invention, there is provided a set diagram display control apparatus comprising:

display means for displaying a set diagram indicative of a set (6 of FIG. 1); and control means for controlling a display of the display means so that data on the set goes and is disposed in a corresponding area of the set diagram displayed on the display means (2 of FIG. 1; S806 of FIG. 26; S909, S913 of FIG. 28; FIGS. 27B, 30A, 31A).

According to the inventive set diagram display control apparatus, the display means displays a set diagram indicative of a set. The control means controls a display of the display means so that data on the set goes and is disposed in a corresponding area of the set diagram displayed on the display means.

Thus, information on the elements and element counts of the set are displayed in the corresponding areas of the set diagrams, so that each area and information on the set placed in correspondence to that area can be confirmed simultaneously on the same picture, and the sets can be efficiently analyzed.

In this set diagram display control apparatus, the control means may control the display of said display means so as to display the data on the set with a symbol in the corresponding area in the set diagram displayed by the display means.

According to the inventive set diagram display control apparatus, when the information on the set is displayed in an area corresponding to the set within the set diagram, that information is displayed in a symbol. Thus, its display is performed simply in order. When there is especially a large amount of information to be displayed on a set diagram, and hence even when all the information cannot be displayed in numerical value, it can be displayed in symbol without omission.

This set diagram display control apparatus may further comprise set data specifying means for specifying any data selected from among the data on the set displayed by said control means (3, 4 of FIG. 1);

distinctive display control means for distinctively displaying the data specified by the set data specifying means (2 of FIG. 1; S911, S915 of FIG. 27; FIGS. 30B, 31B); and area data display control means for controlling the display of the display means so as to display on the display means data on an area to which the data specified by the set data specifying means belongs (2 of FIG. 1; S912, S916, S917 of FIG. 28; FIGS. 30B, 31B).

According to the inventive set diagram display control apparatus, if any one of items of information on the sets displayed in the set diagrams is specified, information on the area to which the specified item of information belongs is displayed. Thus, the whole outline of information on the sets and details of each of the items of information on the sets can be immediately confirmed in an easy operation. Especially, when an element of the set is displayed in a symbol as information on the set, it is confirmed by specifying the displayed symbol.

As scribed above, according to the inventive first set calculation apparatus, when an expression of sets is input, a corresponding calculation corresponding to this input expression is made among the elements of the respective sets, and the result of the calculation is obtained and displayed, for example, as the elements and element count of a common set or a sum set.

According to the inventive third set calculation apparatus, when an expression of sets is input, a diagram indicative of a relation between the sets corresponding to the input expressions is displayed with the respective set diagrams being arranged depending on the relation between the sets.

According to the inventive second set calculation apparatus, when an expression of sets is input, a diagram indicative of a relation between the sets corresponding to the input expressions is displayed with the respective set diagrams being arranged depending on the relation between the sets. Calculation corresponding to the input expression is made among the elements of the respective sets, and the result of the calculation is obtained and displayed, for example, as the elements and element count of a common set or a sum set.

Thus, according to the present invention, calculation regarding the sets can be made and diagrams indicative of the set relation can be displayed.

According to the present invention, the size of the set diagram is determined depending on information on the input set, and the set diagram is displayed in that size within the displayed range. Thus, the set diagrams are always displayed manifestly irrespective of whether the element counts of the respective set s are large or not. Even when a set diagram is displayed, for example, on a function calculator having a relatively small display screen, it is displayed flexibly in accordance with information on a set such as, for example, the input element count.

According to the present invention, the display positions and sizes of the diagrams which constitute the set diagrams are determined in accordance with the input information on the sets and displayed, so that the element count of each set can match the size of the diagram indicative of that set. For example, it is ensured that the size of a common set to a plurality of sets matches the element count of the common set, so that each set relation can be displayed correctly. As a result, the user can correctly understand the relation instantaneously and visually, so that the user can understanding the set better.

According to the present invention, the specified area is displayed distinctively, so that the user can easily and visually recognize the area where the appropriate process is being performed now. Thus, the user can input, for example, an element count of a set while confirming that area visually, and can operate the set diagram display control apparatus correctly and easily.

According to the inventive set diagram display control apparatus, the specified area is distinctively displayed, while information on the relation between the sets concerned, the element count, and the elements in the specified area can be displayed so that the set diagrams can easily analyzed in an easy operating manner.

According to the inventive set diagram display control apparatus, when the set expression is input, an area corresponding to the set expression is distinctively displayed, and information on the element count for the area is displayed. Thus, the relation between the set expression and the set diagram is easily understood.

According to the present invention, information on the elements and element counts of the sets are displayed in the corresponding areas of the set diagrams, so that each area and information on the set placed in correspondence to that area can be confirmed simultaneously on the same picture, and the sets can be efficiently analyzed.

According to the inventive set diagram display control apparatus, when the information on the set is displayed in an area corresponding to the set within the set diagram, that information is displayed in a symbol. Thus, its display is performed simply in order. When there is especially a large amount of information to be displayed on a set diagram, and hence even when all the information cannot be displayed in numerical value, it can be displayed in symbol without omission.

According to the inventive set diagram display control apparatus, if any one of items of information on the sets displayed in the set diagrams is specified, information on the area to which the specified item of information belongs is displayed. Thus, the whole outline of information on the sets and details of each of the items of information on the sets can be immediately confirmedin an easy operation. Especially, when an element of the set is displayed in a symbol as information on the set, it is confirmed by specifying the displayed symbol.

What is claimed is:

1. A mathematical set display apparatus comprising:

set expression storage means for storing an expression of mathematical sets;

set diagram display control means for controlling a display to display a set diagram which indicates a relation of sets corresponding to the expression of mathematical sets stored in the set expression storage means, wherein the set diagram comprises one of a plurality of circles and a plurality of ellipses which overlap with each other;

area designating means for designating a desired area in the set diagram displayed by the set diagram display control means; and distinctive display control means for causing the display to display the area designated by the area designating means in a manner which is distinguishable from another area, wherein the area designating means designates the desired area by inputting a mathematical set expression.

2. A recording medium which contains a computer readable set diagram display control program which causes a computer to function as:

a set expression storage means for storing an expression of mathematical sets;

a set diagram display control means for controlling a display to display a set diagram which indicates a relation of sets corresponding to the expression of mathematical sets stored, wherein the set diagram comprises one of a plurality of circles and a plurality of ellipses which overlap with each other;

an area designating means for designating a desired area in the set diagram; and distinctive display control means for causing the display to display the designated area in a manner which is distinguishable from another area, wherein the desired area is designated by inputting a mathematical set expression.

3. A mathematical set display method comprising:

a set expression storage step for storing an expression of mathematical sets;

a set diagram display control step for controlling a display to display a set diagram which indicates a relation of sets corresponding to the expression of stored mathematical sets, wherein the set diagram comprises one of a plurality of circles and a plurality of ellipses which overlap with each other;

an area designating step for designating a desired area in the displayed set diagram; and a distinctive display control step for causing the display to display the designated area in a manner which is distinguishable from another area, wherein the desired area is designated by inputting a mathematical set expression.

* * * * *